US012498704B2

(12) United States Patent
Sanai et al.

(10) Patent No.: US 12,498,704 B2
(45) Date of Patent: Dec. 16, 2025

(54) ABNORMALITY SYMPTOM ANALYZING DEVICE

(71) Applicant: Mitsubishi Electric Corporation, Tokyo (JP)

(72) Inventors: Kotaro Sanai, Tokyo (JP); Emi Yoneda, Tokyo (JP); Masayo Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 531 days.

(21) Appl. No.: 17/924,883

(22) PCT Filed: Jun. 5, 2020

(86) PCT No.: PCT/JP2020/022251
§ 371 (c)(1),
(2) Date: Nov. 11, 2022

(87) PCT Pub. No.: WO2021/245905
PCT Pub. Date: Dec. 9, 2021

(65) Prior Publication Data
US 2023/0185289 A1    Jun. 15, 2023

(51) Int. Cl.
*G05B 19/418*     (2006.01)
(52) U.S. Cl.
CPC ............... *G05B 19/41875* (2013.01); *G05B 2219/32179* (2013.01)
(58) Field of Classification Search
CPC .... G01N 33/00; G01N 21/3504; G01N 29/04; G01N 21/35; G01N 29/00; G01N 29/12;
(Continued)

(56) References Cited

U.S. PATENT DOCUMENTS

2009/0278856 A1    11/2009  Suzuki
2013/0169794 A1*   7/2013   Shimomura ............ E01C 23/01
                                                    348/128
(Continued)

FOREIGN PATENT DOCUMENTS

JP     H09198126 A      7/1997
JP     2008278043 A    11/2008
(Continued)

OTHER PUBLICATIONS

International Search Report (PCT/ISA/210) with translation and Written Opinion (PCT/ISA/237) mailed on Aug. 11, 2020, by the Japan Patent Office as the International Searching Authority for International Application No. PCT/JP2020/022251. (11 pages).

(Continued)

*Primary Examiner* — Rayeez R Chowdhury
(74) *Attorney, Agent, or Firm* — Buchanan Ingersoll & Rooney PC

(57) ABSTRACT

An abnormality symptom analyzing device comprises: a data request receiver to perform request and reception of data, required for analyzing an abnormality symptom(s), including measurement information obtained from a sensor (s) of a facility, an abnormality symptom(s) detected from the measurement information and inspection information of the facility; a data storage device to store the data acquired by the data request receiver; a coordination circuitry to perform the registration of data to display a screen display component(s) on a display device and the correspondence of data coordinated between screen display components to a screen display component(s) coordinated, and to store information modified according to input contents from an input device, whereby modification contents are coordinated to the screen display components; and a component graphics-drawing management circuitry to acquire data through the coordination circuitry, and to display details information of (Continued)

the facility and propagation information of an abnormality symptom(s) in signals.

6 Claims, 25 Drawing Sheets

(58) Field of Classification Search
CPC ...... G01N 21/84; G01N 27/447; G01N 29/07; G01N 29/30
See application file for complete search history.

(56) References Cited

U.S. PATENT DOCUMENTS

| | | | |
|---|---|---|---|
| 2014/0229001 A1* | 8/2014 | Tsujita | G06Q 10/087 700/218 |
| 2015/0213706 A1 | 7/2015 | Bai et al. | |
| 2015/0363925 A1 | 12/2015 | Shibuya et al. | |
| 2020/0151199 A1 | 5/2020 | Nakamura | |

FOREIGN PATENT DOCUMENTS

| | | |
|---|---|---|
| JP | 2012089057 A | 5/2012 |
| JP | 2014048697 A | 3/2014 |
| JP | 2014142697 A | 8/2014 |
| JP | 2015046005 A | 3/2015 |
| JP | 2016143104 A | 8/2016 |
| WO | 2018207350 A1 | 11/2018 |
| WO | 2019093417 A1 | 5/2019 |

OTHER PUBLICATIONS

Office Action dated May 17, 2024, issued in the corresponding Canadian Patent Application No. 3,179,916, 4 pages.

* cited by examiner

| SCREEN DISPLAY COMPONENT'S ID | COMPONENT'S NAME | GRAPH-COORDINATES | WIDTH | HEIGHT |
|---|---|---|---|---|
| 001 | SIGNAL SELECTION LISTING COMPONENT | Left: 0%, Top: 10% | 25% | 0% |
| 002 | TIME-PERIOD SELECTED COMPONENT | Left: 0%, Top: 80% | 90% | 90% |
| 003 | THREE-DIMENSIONAL PROPAGATION COMPONENT | Left: 30%, Top: 10% | 60% | 0% |
| 004 | PROPAGATION DETAILS COMPONENT | Left: 30%, Top: 60% | 30% | 40% |
| 005 | PLANT DETAILS COMPONENT | Left: 65%, Top: 60% | 30% | 40% |

FIG. 8

| SCREEN DISPLAY COMPONENT'S ID | COMPONENT'S NAME | COORDINATION DATA |
|---|---|---|
| 001 | SIGNAL SELECTION LISTING COMPONENT | SELECTION SIGNAL LISTING INFORMATION |
| 002 | TIME-PERIOD SELECTED COMPONENT | DISPLAY TIME-PERIOD INFORMATION |
| 003 | THREE-DIMENSIONAL PROPAGATION COMPONENT | SELECTION SIGNAL LISTING INFORMATION |
| 004 | PROPAGATION DETAILS COMPONENT | SELECTION SIGNAL LISTING INFORMATION |
| | | DISPLAY TIME-PERIOD INFORMATION |
| 005 | PLANT DETAILS COMPONENT | SELECTION SIGNAL LISTING INFORMATION |
| | | DISPLAY TIME-PERIOD INFORMATION |

| IDENTIFIER | COORDINATION DATA | DATA STRUCTURE | EVENT INSTRUCTION CONTENTS |
|---|---|---|---|
| SigData | SELECTION SIGNAL LISTING INFORMATION | [A0001, A0002, A0003, ... , A0030] | MODIFICATION OF DISPLAY SIGNAL LISTING DATA |
| DateRange | DISPLAY TIME-PERIOD INFORMATION | [2017-2-9 00:00:00, 2017-2-28 23:59:59] | MODIFICATION OF DISPLAY TIME-PERIOD DATA |
| DataPoint | GIVEN POINT | [2017-2-18 15:00:00] | MODIFICATION OF GIVEN POINT DATA |
| ModeType | SCREEN DISPLAY COMPONENT'S INFORMATION | [005] | MODIFICATION OF DISPLAY ON SCREEN DISPLAY COMPONENT |

| SCREEN DISPLAY COMPONENT'S ID | COMPONENT'S NAME | GRAPH-COORDINATES | WIDTH | HEIGHT |
|---|---|---|---|---|
| 001 | SIGNAL SELECTION LISTING COMPONENT | Left: 0%, Top: 10% | 25% | 0% |
| 002 | TIME-PERIOD SELECTED COMPONENT | Left: 0%, Top: 80% | 90% | 90% |
| 003 | THREE-DIMENSIONAL PROPAGATION COMPONENT | Left: 30%, Top: 10% | 60% | 0% |
| 004 | PROPAGATION DETAILS COMPONENT | Left: 30%, Top: 60% | 30% | 40% |
| 005 | PLANT DETAILS COMPONENT | Left: 65%, Top: 60% | 30% | 40% |
| 006 | COLOR DISPLAY COMPONENT | Left: 65%, Top: 60% | 30% | 40% |

| SCREEN DISPLAY COMPONENT'S ID | COMPONENT'S NAME | COORDINATION DATA | EVENT IDENTIFIER |
|---|---|---|---|
| 001 | SIGNAL SELECTION LISTING COMPONENT | SELECTION SIGNAL LISTING INFORMATION | SigData |
| 002 | TIME-PERIOD SELECTED COMPONENT | DISPLAY TIME-PERIOD INFORMATION | DateRange |
| 003 | THREE-DIMENSIONAL PROPAGATION COMPONENT | GIVEN POINT | DataPoint |
| | | SELECTION SIGNAL LISTING INFORMATION | SigData |
| | | GIVEN POINT | DataPoint |
| 004 | PROPAGATION DETAILS COMPONENT | SELECTION SIGNAL LISTING INFORMATION | SigData |
| | | DISPLAY TIME-PERIOD INFORMATION | DateRange |
| | | GIVEN POINT | DataPoint |
| 005 | PLANT DETAILS COMPONENT | SELECTION SIGNAL LISTING INFORMATION | SigData |
| | | DISPLAY TIME-PERIOD INFORMATION | DateRange |
| | | SCREEN DISPLAY COMPONENT'S INFORMATION | ModeType |
| | | GIVEN POINT | DataPoint |
| 006 | COLOR DISPLAY COMPONENT | SELECTION SIGNAL LISTING INFORMATION | SigData |
| | | DISPLAY TIME-PERIOD INFORMATION | DateRange |
| | | SCREEN DISPLAY COMPONENT'S INFORMATION | ModeType |
| | | GIVEN POINT | DataPoint |

ABNORMALITY SYMPTOM ANALYZING DEVICE

TECHNICAL FIELD

The disclosure of the present application relates to an abnormality symptom analyzing device.

BACKGROUND ART

Generally, in a plant-facility, an enormous amount of its data on sensor data of operational conditions, temperature, pressure, a flow rate and the like, or on inspection data or the like of those is collected or gathered for the sake of the operations, and that of maintenance and management. In order to reach a high degree of sophistication in facility operations and that in its management, technologies have been underway for detecting abnormality symptoms by carrying out 'learning' in which, from the data having been gathered, data in normal times and that in abnormal times are utilized for analytical technology such as artificial intelligence, AI, or the like, and by performing the comparison between the data being gathered in real time and the 'learning' result. By performing the notification to an operator before abnormality due to a malfunction of a facility or an accident thereon such as fire or the like is to occur, it becomes possible to promote determination and to take countermeasures before a device(s) is to be stopped, and thus, the reduction of operational costs or optimization of the facility management has been expected. However, in the determination on abnormality through the AI or a stochastic process, the determination therethrough means its deviation from a threshold value(s) or from learning data, and so, the determination does not stand for explaining what kind of phenomenon has occurred under actual circumstances. In addition, from only a detection result(s), it is difficult to determine a counter or support measure from that time on.

For dealing therewith, as a purpose to make the explanation easier for supporting grounds of determination on abnormality or those of an abnormality symptom(s) and for the phenomenon, devices are proposed in each of which the display is capable of making a determination result easier to be verified. For example, according to Patent Document 1, a GUI screen is proposed in which supporting grounds of determination on a single signal and its phenomenon can be verified by means of a stochastic process, and it is so stated that the supporting grounds for abnormality determination with respect to the single signal can be explained. In addition, according to Patent Document 2, a GUI screen is proposed in which the verification can be made whether a determination scheme of abnormality having been detected based on a plurality of related signals accurately functions or not, and it is so stated that the determination scheme can be explained with respect to the plurality of signals.

RELATED ART DOCUMENTS

Patent Documents

[Patent Document 1] Japanese Patent Laid-Open No. 2012-89057
[Patent Document 2] Japanese Patent Laid-Open No. 2014-142697
[Patent Document 3] Japanese Patent Laid-Open No. 2008-278043

SUMMARY OF THE INVENTION

Problems to be Solved by the Invention

In Patent Document 1, a GUI screen is proposed in which, from the number of abnormality detections and plant data, and from a detection-rule condition(s), it is possible by means of a stochastic process to verify supporting grounds for abnormality determination on a single signal and its phenomenon; however, the explanation cannot be made for supporting grounds and a phenomenon where abnormality is caused intervening to cover across a plurality of signals. In addition, in Patent Document 2, a GUI screen is proposed which is capable of verifying whether the function is accurately undergoing in a determination scheme of abnormality having been detected by a plurality of related signals from the number of abnormality detections and plant data, and from a detection-rule condition(s); however, in a case of detecting abnormality having propagated with delay or in that of detecting a factor(s) at an early stage in which abnormality appears, there exist variations in propagation speeds of abnormality depending on events or incidents each. And thus, there exists a possibility of detecting such abnormality to an excessive degree according to a detection method in a mechanical manner. In such a case, it is necessary for a human being to search the factor(s). Moreover, the GUI screen is not the one capable of verifying the propagation of abnormality on and over a plurality of signals, and thus, there arises a problem in that the explanation is difficult to be made for an event or incident which is caused by the plurality of signals.

The present disclosure in the application concerned has been directed at solving those problems as described above, an object of the disclosure is to provide an abnormality symptom analyzing device in which, by displaying abnormality propagation of a plurality of signals for a human being to easily search it, an access capability to data which is causing an abnormality symptom(s) and is acting as its factor(s) is enhanced, and the explanation for a phenomenon causing the abnormality is made easier.

Means for Solving the Problems

An abnormality symptom analyzing device disclosed in the disclosure of the application concerned is an abnormality symptom analyzing device which comprises:

a data request receiver to request transmission of date-time attached data including measurement information obtained from a sensor mounted on a facility, detection information detected from the measurement information and inspection information obtained by inspecting the facility to a data storage device being externally provided for storing said data therein, and for receiving said data from the data storage device;

a data storage device to receive from the data request receiver said data, and storing it in the data storage device;

a coordination circuitry for receiving said data from the data storage device, and, at a time when said data is classified in accordance with a kind of data being received and at a time when each different piece of which is displayed on an externally provided display device as screen display components including a time-period selected component for a selection of a display time-period and including a three-dimensional propagation component to display a situation in which an abnormality symptom of a plurality of signals propagates, for making coordination data, having display time-period information including a display date-time being coordinated between screen display components, corresponding to the screen display components each having the coordination data so that the data being made corresponding to is registered as coordination component data in the coordination circuitry; the coordination circuitry for further transmitting to the data storage device the coordination component data being registered, and also for transmitting to the data storage device the coordination component data being made modified in accordance with modification of the coordination data having display time-period information which is modified and which includes modification of the display date-time;

a component graphics-drawing management circuitry to receive said date-time attached data from an input device being externally provided and to transmit the data being received to the coordination circuitry, and also to acquire data stored in the data storage device by way of the coordination circuitry; and the component graphics-drawing management circuitry further to perform a graphics-drawing process including a graphics-redrawing process to display on the display device said data in each piece of which being classified and while being made corresponding to the inspection information and to the measurement information in accordance with screen display components whose display time-periods are each shortened among pieces of data being acquired, and for transmitting to the display device data on which a graphics-drawing process is performed and in which, on a basis of display time-period information being modified, a detection result of an abnormality symptom corresponding to the facility and being detected on a rule base through an artificial intelligence technology or a stochastic process is included.

Effects of the Invention

According to the abnormality symptom analyzing device disclosed in the disclosure of the application concerned, it becomes possible to provide an abnormality symptom analyzing device in which, by displaying abnormality propagation of a plurality of signals for a human being to easily search it, an access capability to data which is causing an abnormality symptom(s) and is acting as its factor(s) is enhanced, and the explanation for a phenomenon causing the abnormality is made easier and also, while propagation tendency on an abnormality symptom(s) is grasped, it becomes possible to achieve that, by taking a time-duration or time-period as the core and by narrowing down information being intendedly verified in detail, data which is causing the abnormality symptom(s) and is acting as its factor(s) is easily searched.

BRIEF DESCRIPTION OF DRAWINGS

FIG. 8 is a diagram showing an example of coordination items in which the abnormality symptom analyzing device according to Embodiment 1 uses for screen display components;

FIG. 17 is a diagram showing an example of an event type in the abnormality symptom analyzing device according to Embodiment 2;

FIG. 19 is a diagram showing a data example of screen display components which are coordinated in the coordination component registration unit of the abnormality symptom analyzing device according to Embodiment 2;

FIG. 20 is a diagram showing an example of coordination items in which the abnormality symptom analyzing device according to Embodiment 2 uses for screen display components;

EMBODIMENTS FOR CARRYING OUT THE INVENTION

Embodiment 1

Figure 1:
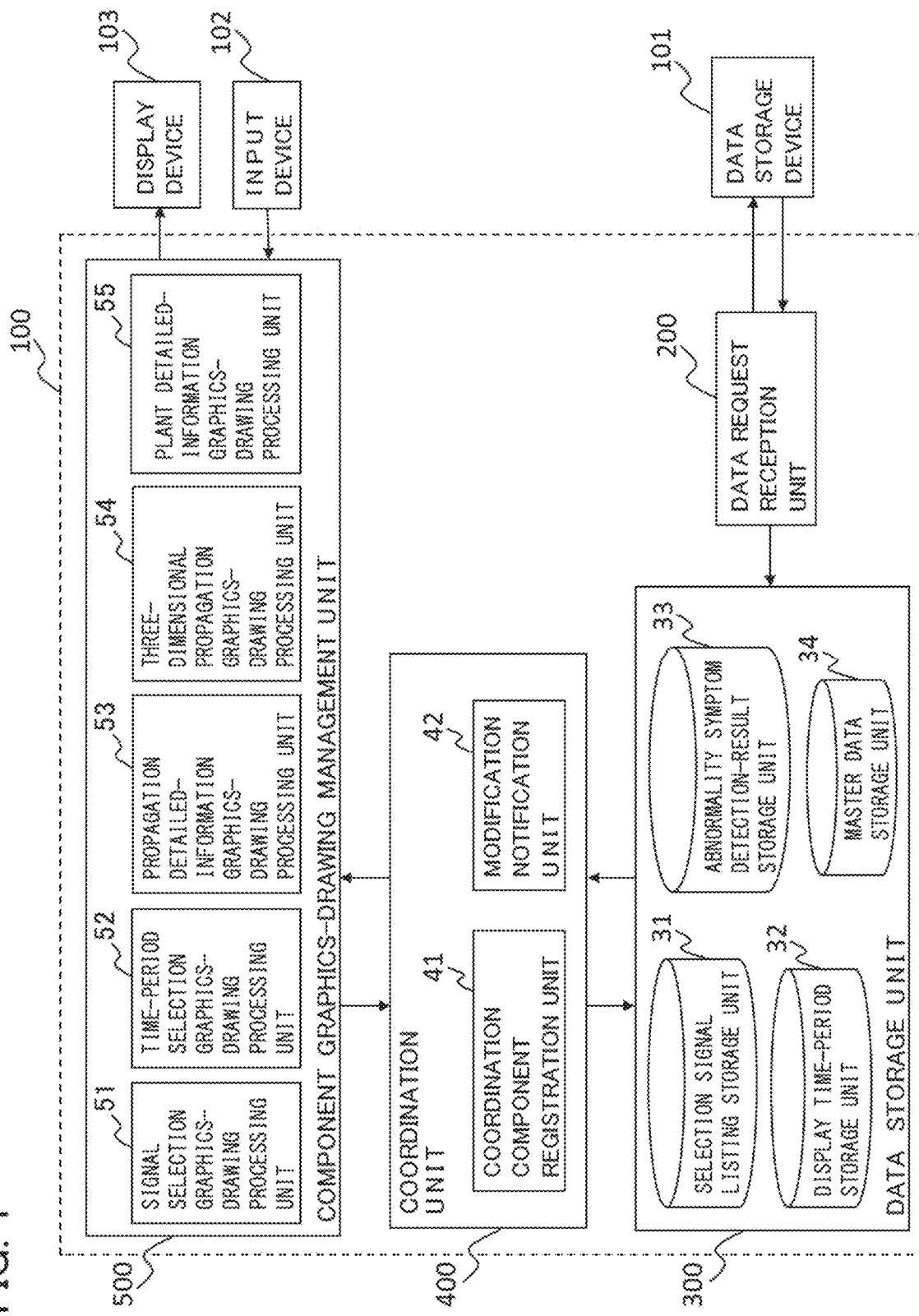
FIG. 1 is a configuration diagram illustrating, by way of example, an abnormality symptom analyzing device according to Embodiment 1.

Hereinafter, the explanation will be made referring to the drawings for an abnormality symptom analyzing device according to Embodiment 1. FIG. 1 is a configuration diagram illustrating the abnormality symptom analyzing device. In FIG. 1, the abnormality symptom analyzing device 100 is constituted of a data request reception unit 200, a data storage unit 300, a coordination unit 400 and a component graphics-drawing management unit 500.

In addition, the data storage unit 300 is constituted of a selection signal listing storage unit 31, a display time-period storage unit 32, an abnormality symptom detection-result storage unit 33 and a master data storage unit 34. The coordination unit 400 is constituted of a coordination component registration unit 41 and a modification notification unit 42. The component graphics-drawing management unit 500 is constituted of a signal selection graphics-drawing processing unit 51, a time-period selection graphics-drawing processing unit 52, a propagation detailed-information graphics-drawing processing unit 53, a three-dimensional propagation graphics-drawing processing unit 54 and a plant detailed-information graphics-drawing processing unit 55.

Figure 2:
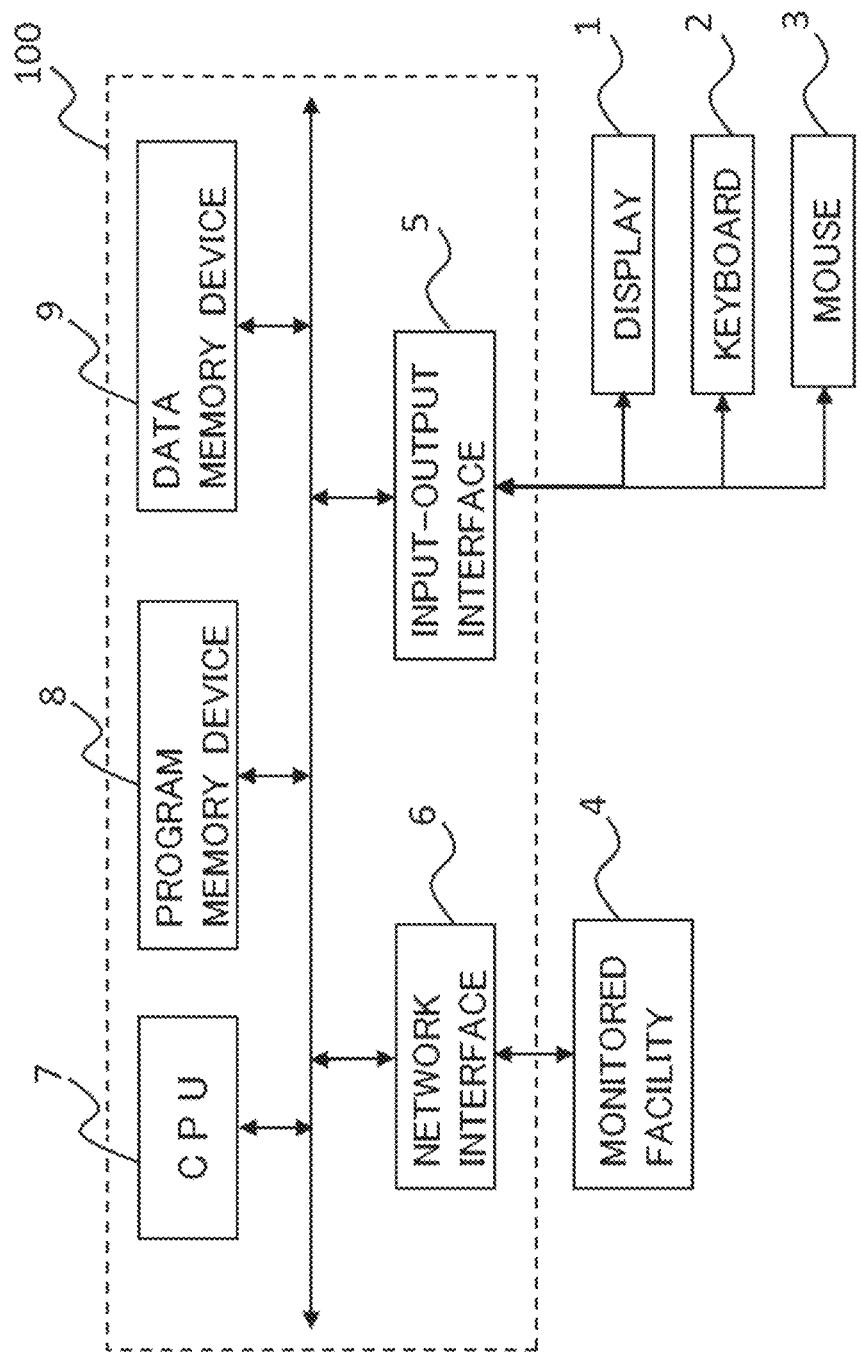
FIG. 2 is a diagram illustrating, by way of example, a hardware configuration of the abnormality symptom analyzing device according to Embodiment 1.

FIG. 2 is a hardware configuration diagram of the abnormality symptom analyzing device 100. As an example is illustrated in FIG. 2, the abnormality symptom analyzing device 100 comprises a central calculation processing device 7 (CENTRAL PROCESSING UNIT, namely, CPU 7), a program memory device 8, a data memory device 9, a network interface 6, and an input-output interface 5. The CPU 7 executes a program(s) stored in the program memory device 8, whereby the functions of the data request reception unit 200, those of the coordination unit 400 and those of the component graphics-drawing management unit 500 are achieved. Note that, the CPU 7 may be made of a microprocessor, a microcomputer, a digital signal processor (DIGITAL SIGNAL PROCESSOR, namely, DSP) or the like.

In addition, the functions of the data storage unit 300 are achieved by the data memory device 9.

Here, the data memory device 9 may be made of volatile or nonvolatile semiconductor memories such as, for example, a hard-disk drive (HARD DISK DRIVE, namely, HDD), a random access read-write memory (RANDOM ACCESS MEMORY, namely, RAM), a read-only memory (READ ONLY MEMORY, namely, ROM), a flash memory, an erasable programmable read-only memory (EPROM), an electrically erasable programmable read-only memory (EEPROM) and the like, and/or made of a memory (memory medium) including a magnetic disk, a flexible disk, an optical disk, a compact disc, a Mini Disc, a DVD or the like, or a whole category of memory media which will be used from this time forward.

The reception of data inputted from a monitored facility 4 is achieved by means of the network interface 6.

And then, the abnormality symptom analyzing device 100 is connected to a display 1 on the periphery of the abnormality symptom analyzing device, and to a keyboard 2 and a mouse 3 on the periphery thereof through the input-output interface 5 therein. Here, the display 1 corresponds to a display device 103; and the keyboard 2 and the mouse 3 each correspond to an input device 102.

Figure 3:
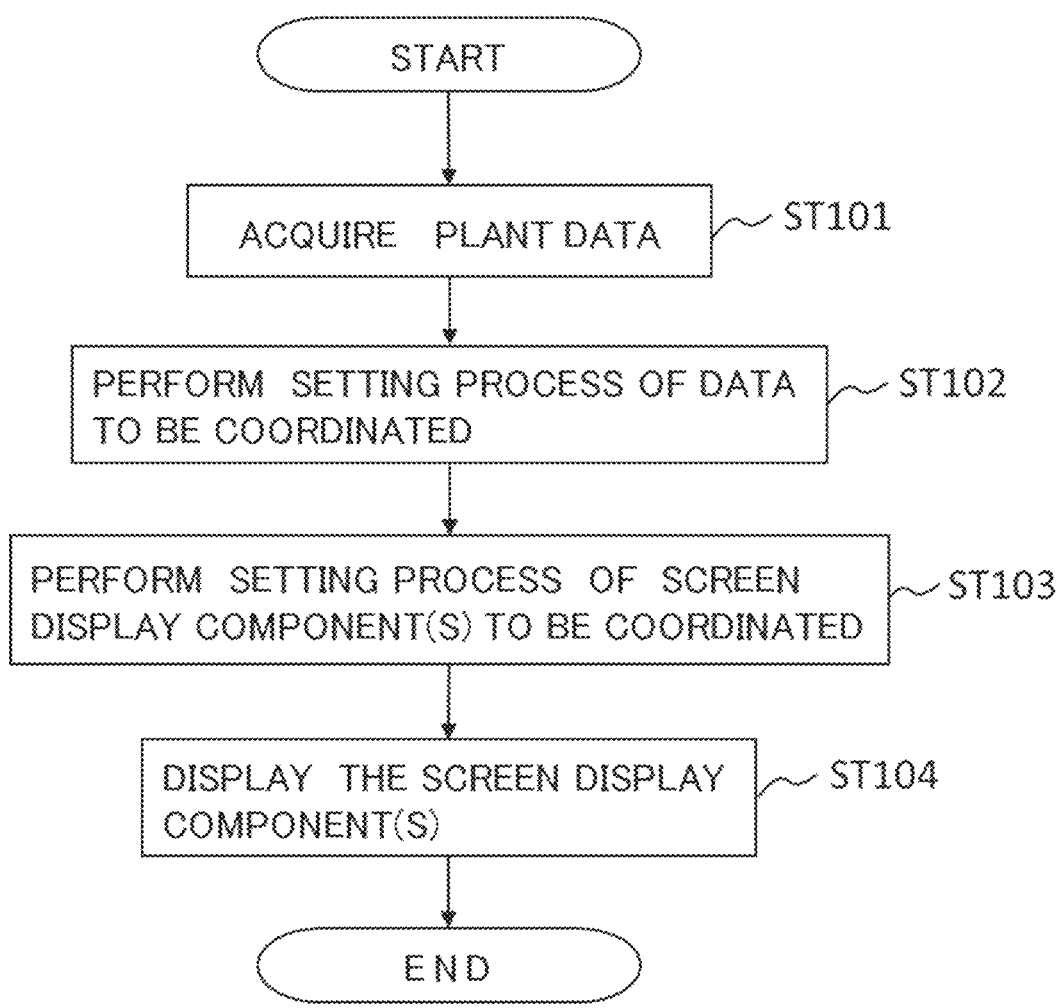
FIG. 3 is a diagram showing a flowchart illustrating the operations after the abnormality symptom analyzing device according to Embodiment 1 acquires plant data until it displays a screen display component(s)

FIG. 3 is a flowchart according to Embodiment 1. Referring to FIG. 3 through FIG. 14, the explanation will be made for the operations until the abnormality symptom analyzing device 100 displays abnormality propagation of a plurality of signals in such a manner that a human being can easily search on the basis of plant data.

In the embodiment, the explanation will be made as an example for a case in which collected or gathered are measurement information obtained from data of sensors mounted on each plant-facility such as an electric power generation facility, a factory or the like, and inspection information relating to inspection work where a plant or facility manager performs, and are also pieces of data in relation to an abnormality symptom(s) having been detected on a rule base through an AI technology, a stochastic process or the like.

FIG. 3 is a flowchart illustrating the operations in which plant data is acquired in the data request reception unit 200 until the component graphics-drawing management unit 500 displays a screen display component(s) on the display device 103.

First, at Step ST101, the acquisition of plant data is performed in the data request reception unit 200.

Figure 4:
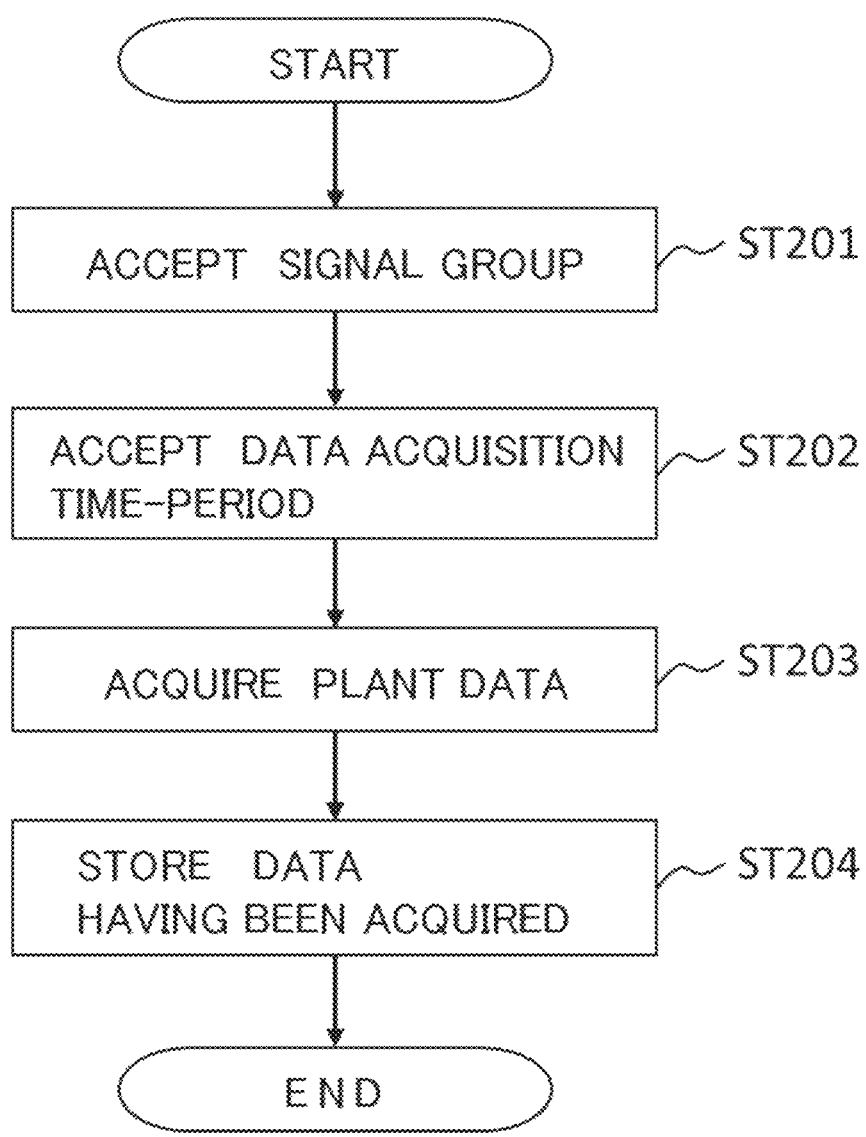
FIG. 4 is a diagram showing a flowchart illustrating the operations until the abnormality symptom analyzing device according to Embodiment 1 acquires plant data and stores the plant data.

FIG. 4 is a flowchart after plant data is acquired in the data request reception unit 200 until the plant data is stored into the data storage unit 300. At Step ST201, a signal group to be displayed on the display device 103 (the explanation of the signal group will be made in detail below) is accepted from a user.

Next, at Step ST202, a data gathering time-period is accepted from the user. Subsequently, at Step ST203, plant data is acquired on the bases of the signal group and the data gathering time-period.

Figure 5:
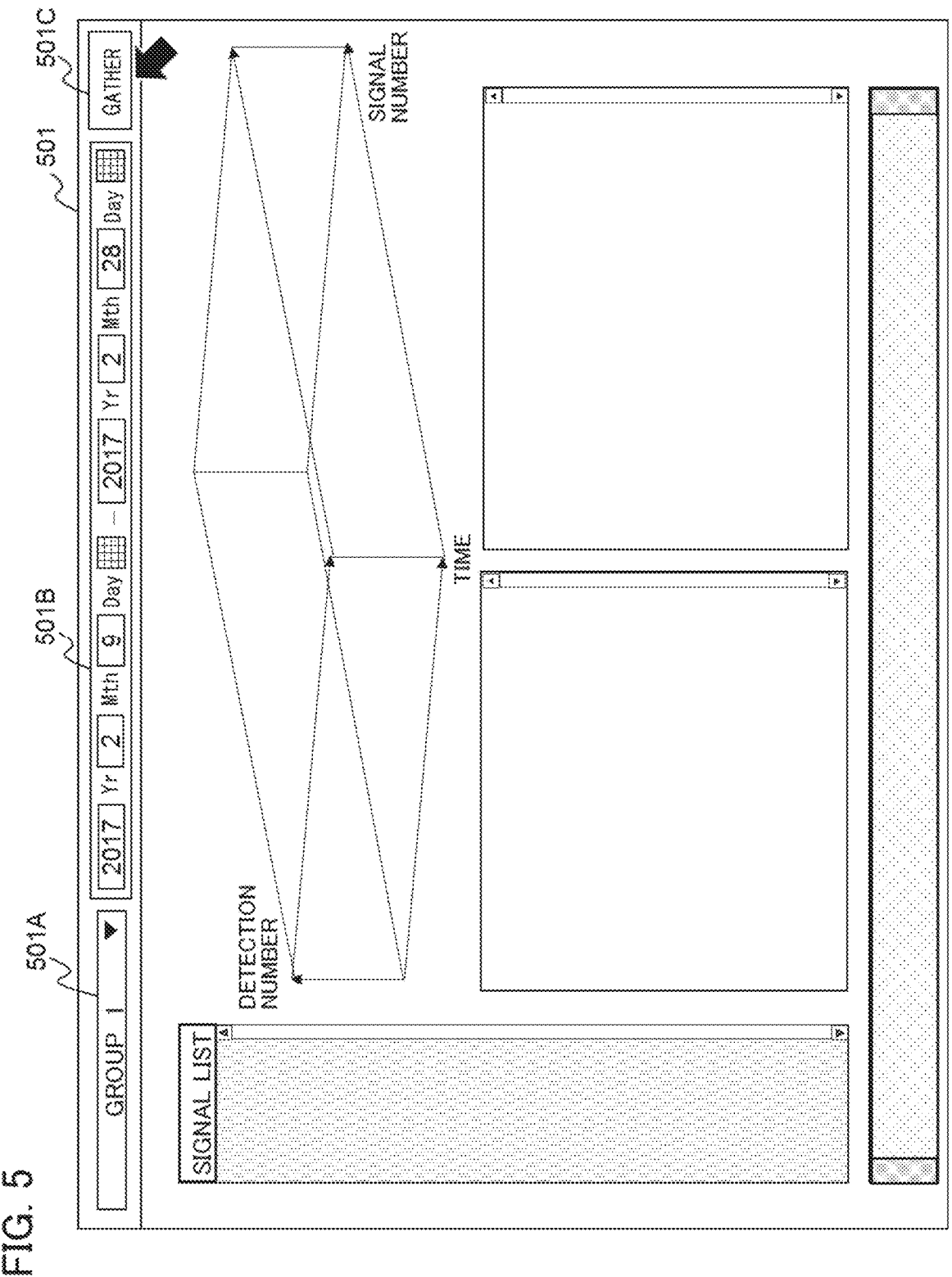
FIG. 5 is a diagram illustrating a screen example when a signal group of plant data and a time-period thereof are selected where the abnormality symptom analyzing device according to Embodiment 1 displays them on its display device.

FIG. 5 is a diagram illustrating a screen example in which a user selects a signal group of plant data to be displayed on the display device 103, and a data gathering time-period thereof. In this case, it is presumed that the signal group is set in advance.

In a plant data selection area 501, the user selects a signal group to be displayed on the display device 103 at a signal group selection area 501A (Step ST201). Next, at a time-period selection area 501B, a time-duration or time-period for acquiring data is selected (Step ST202). After the selection of signal group and that of time-period are ended, the user pushes down a data collecting or gathering button 501C, whereby, on the bases of the selected signal group and time-period, the data request reception unit 200 acquires plant data from a data storage device 101 in which data having been obtained by a plant-facility is stored (Step ST203). Subsequently, at Step ST204, the plant data in which the data request reception unit 200 has acquired is stored into the data storage unit 300.

Next, at Step ST102 in FIG. 3, a setting process of data to be coordinated is performed by way of the coordination unit 400. In the coordination component registration unit 41 of the coordination unit 400, data for coordinating a screen display component(s) is acquired among the pieces of data stored in the data storage unit 300.

Next, at Step ST103 in FIG. 3, a setting process of a screen display component(s) to be coordinated is performed in the coordination unit 400.

Figure 6:
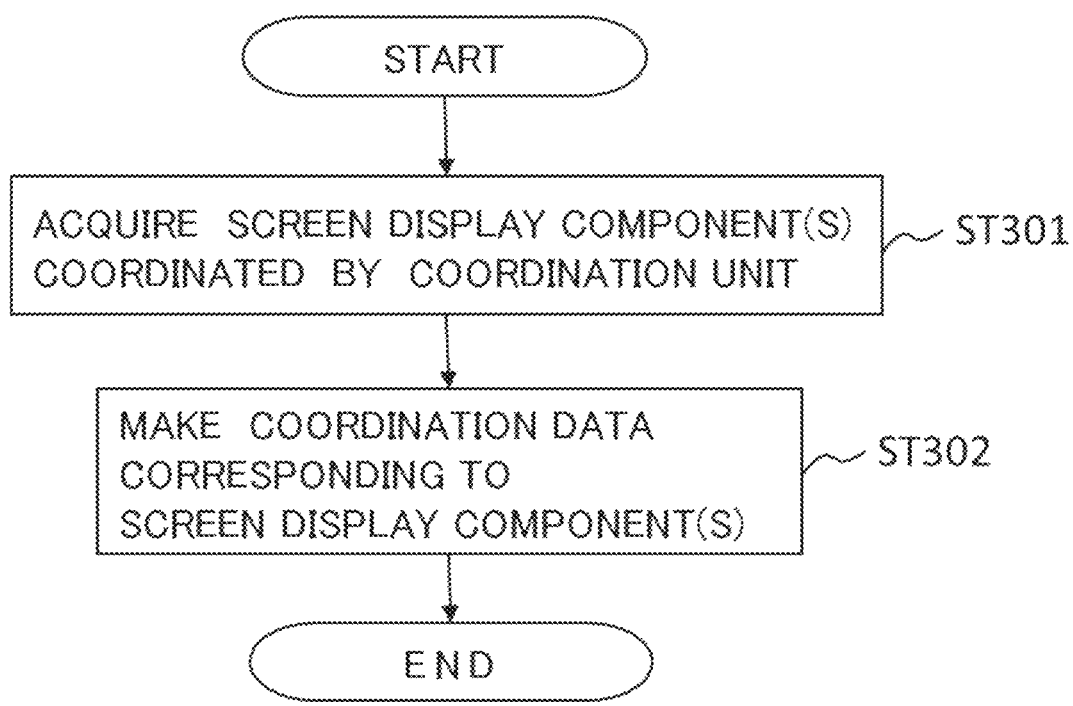
FIG. 6 is a diagram showing a flowchart illustrating the operations until the abnormality symptom analyzing device according to Embodiment 1 performs a setting process of a screen display component(s) to be coordinated.

FIG. 6 is a flowchart illustrating the operations until a setting process of a screen display component(s) to be coordinated is performed in the coordination component registration unit 41.

At Step ST301, a screen display component(s) being coordinated by the coordination unit 400 is acquired by the coordination component registration unit 41.

Figure 7:
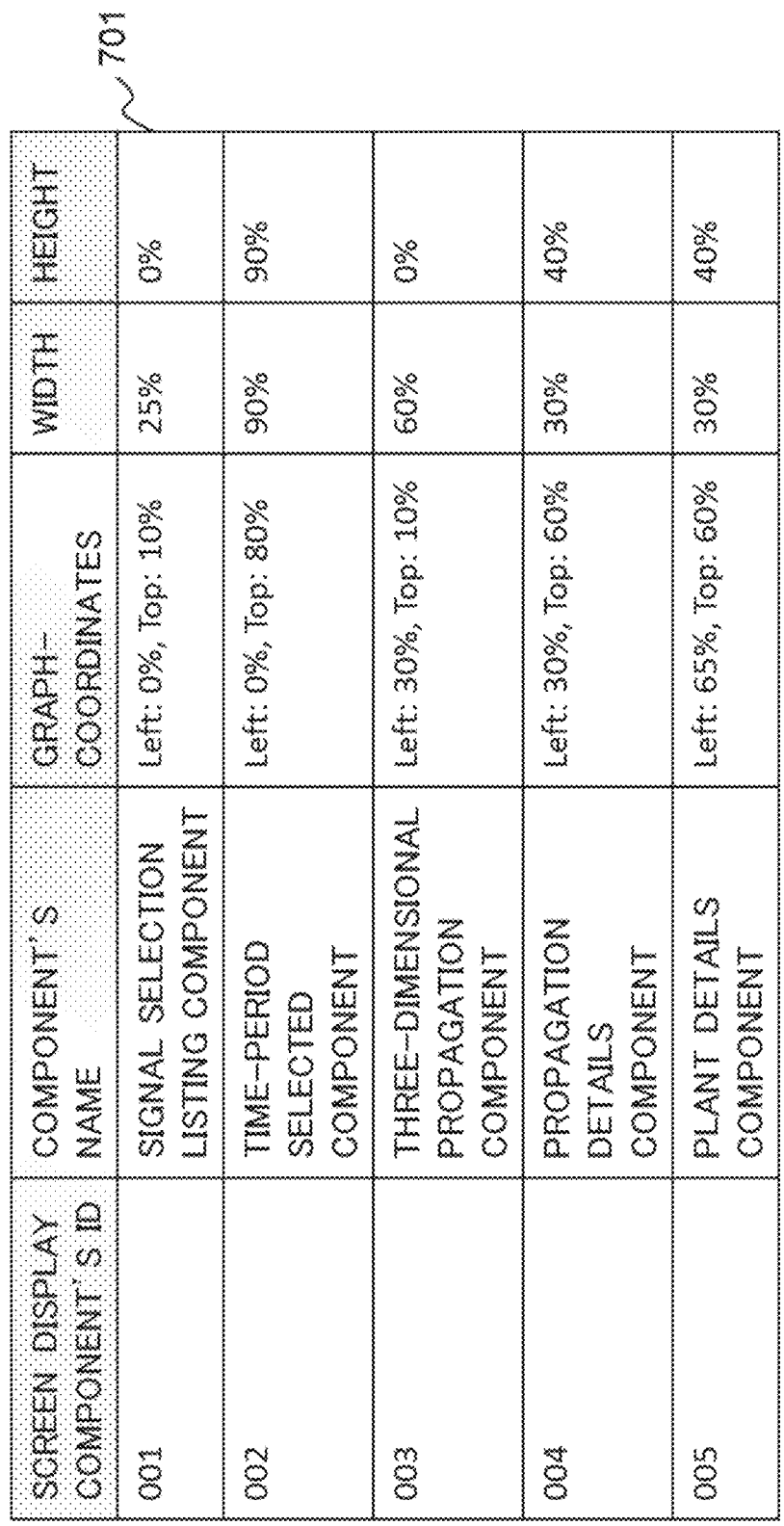
FIG. 7 is a diagram showing a data example of screen display components which are coordinated in a coordination component registration unit of the abnormality symptom analyzing device according to Embodiment 1.

FIG. 7 is a diagram showing a data example of screen display components which are coordinated in the coordination component registration unit 41.

The screen display component's ID of screen display component's data 701 designates a number for identifying a screen display component.

The component's name designates a screen display component's name displayed by the signal selection graphics-drawing processing unit 51, the time-period selection graphics-drawing processing unit 52, the propagation detailed-information graphics-drawing processing unit 53, the three-dimensional propagation graphics-drawing processing unit 54 and the plant detailed-information graphics-drawing processing unit 55 each constituting the component graphics-drawing management unit 500.

Here, a displaying process of a signal selection listing component is performed by the signal selection graphics-drawing processing unit 51; a displaying process of a time-period selected component, performed by the time-period selection graphics-drawing processing unit 52; a displaying process of a three-dimensional propagation component, performed by the three-dimensional propagation graphics-drawing processing unit 54; and a displaying process of a plant details component, performed by the plant detailed-information graphics-drawing processing unit 55.

Here, the graph-coordinates designate a place at which each screen display component is displayed on the display device 103. The width designates the size of horizontal width of each screen display component. The height designates the size of height of each screen display component.

Note that, as for the graph-coordinates, the width and the height, those relative values are each indicated at percentages with respect to a screen of the display device 103; however, an "em," a "rem" or the like each being another relative value notation system may also be used for, or an absolute value specified pixel-notation may be used for.

Next, at Step ST302, coordination data having been acquired in the coordination component registration unit 41 is made corresponding to the screen display component(s).

FIG. 8 is a diagram showing coordination items 801 indicating an example of coordination items used for screen display components each being made corresponding thereto at Step ST301 of FIG. 6 and Step ST302 thereof.

The screen display component's ID designates an ID number for identifying a screen display component.

The screen display component's name designates a screen display component's name displayed by the signal selection graphics-drawing processing unit 51, the time-period selection graphics-drawing processing unit 52, the propagation detailed-information graphics-drawing processing unit 53, three-dimensional propagation graphics-drawing processing unit 54 and the plant detailed-information graphics-drawing processing unit 55 which are five processing units each constituting the component graphics-drawing management unit 500.

The coordination data designates pieces of information each being made coordinated between screen display components by way of the coordination unit 400.

Next, at Step ST104 in FIG. 3, the display of screen display component(s) is performed together in the component graphics-drawing management unit 500 and the coordination unit 400.

Figure 9:
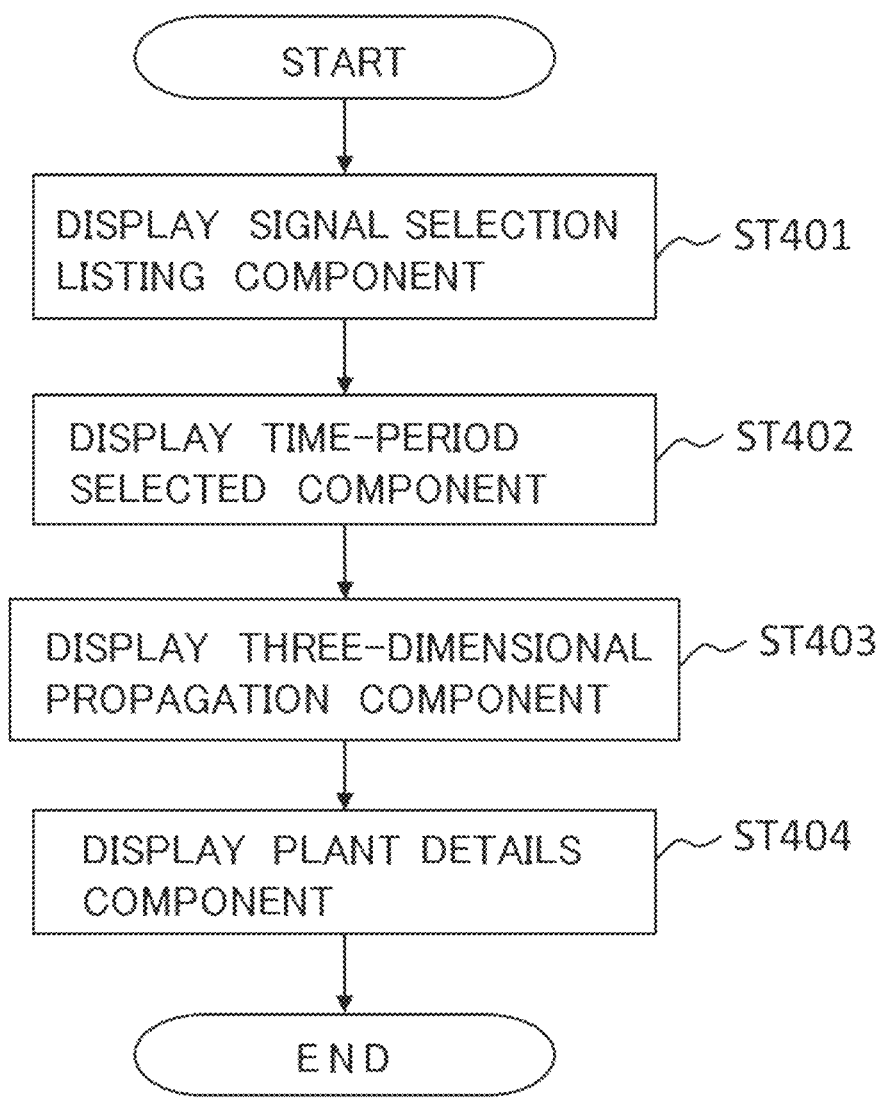
FIG. 9 is a diagram showing a flowchart illustrating the operations until plant details information of the abnormality symptom analyzing device according to Embodiment 1 is displayed on its display device.

FIG. 9 is a flowchart illustrating the operations until plant details information is displayed on the display device 103.

At Step ST401, the display of a signal selection listing component is performed in the signal selection graphics-drawing processing unit 51, on the basis of signal listing information stored in the data storage unit 300.

Next, at Step ST402, a time-period selected component is displayed in the time-period selection graphics-drawing processing unit 52, on the basis of display time-period information stored in the data storage unit 300.

Subsequently, at Step ST403, a three-dimensional propagation component is displayed in the three-dimensional propagation graphics-drawing processing unit, on the basis of an abnormality symptom's detection result(s) stored in the data storage unit 300.

Figure 10:
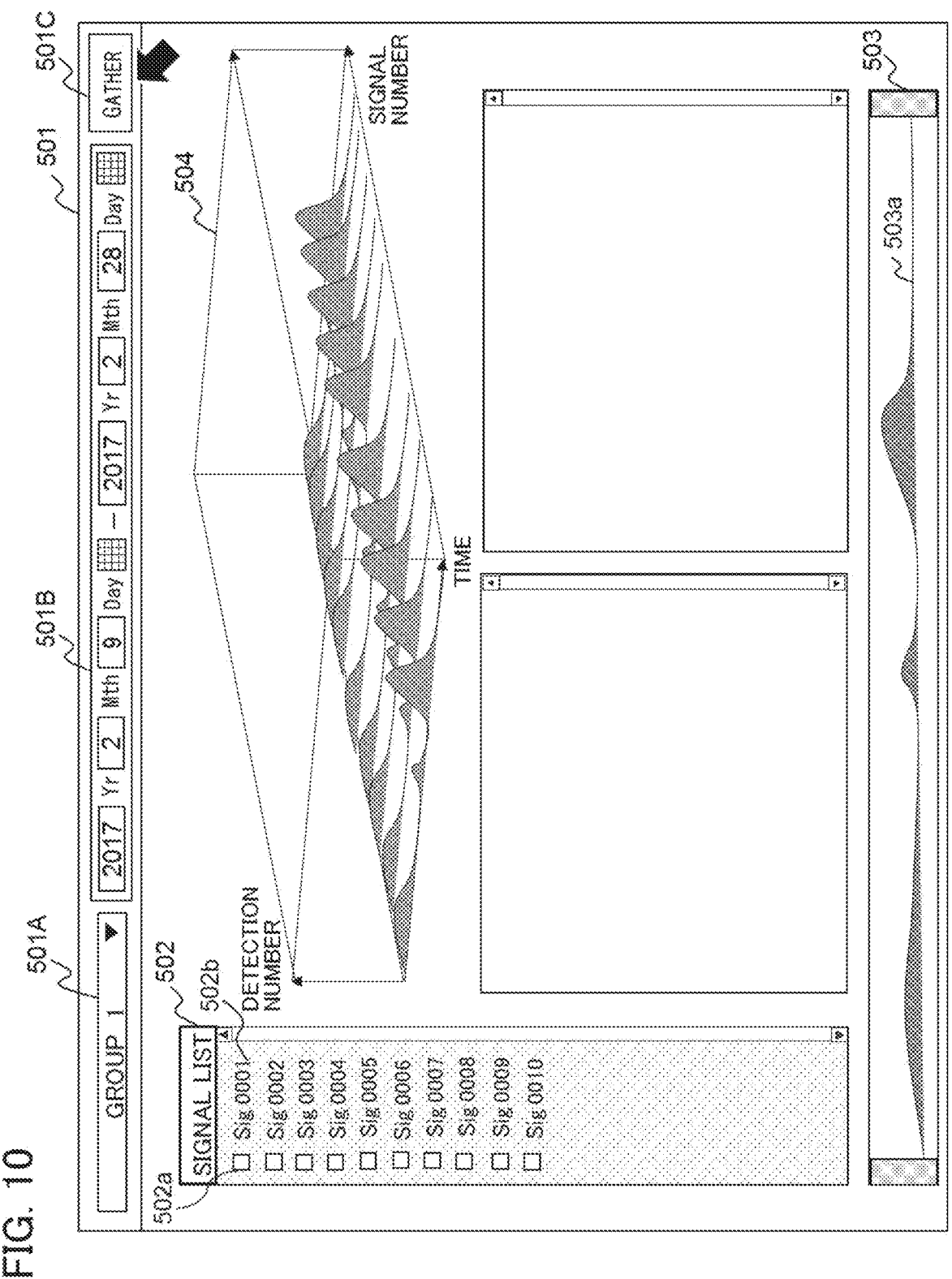
FIG. 10 is a diagram illustrating a screen example of a signal selection listing component, that of a time-period selected component and that of a three-dimensional propagation component in the abnormality symptom analyzing device according to Embodiment 1.

FIG. 10 is a diagram illustrating a screen example of a signal selection listing component, that of a time-period selected component and that of a three-dimensional propagation component.

The acquisition of plant data is performed, and, after the end of setting processes in the coordination unit, the signal selection listing component 502 of FIG. 10, the time-period selected component 503 thereof and the three-dimensional propagation component 504 thereof are displayed on the display device 103.

The signal selection listing component 502 is constituted of a signal selection check box 502a and a signal number 502b.

At the signal number 502b, a signal number(s) of signal listing information stored in the data storage unit 300 is displayed (ST401).

The three-dimensional propagation component 504 shows the number of detection counts, or a detection number, of an abnormality symptom(s) on each of signal numbers having been detected on a rule base through an AI technology or a stochastic process(es). The vertical axis indicates a detection number of an abnormality symptom(s); the horizontal axis gives time; and the depth dimension indicates the number of signals, or a signal number. When the detection number appears to be causing larger than "0" in its counts, a color(s) having the degree of transmittance is filled in within a detection number's graph; and a detection distribution of abnormality symptoms is displayed by their convexes-and-concaves above on the graph and by their areas each being filled in by a color(s) within the graph (ST403).

In the time-period selected component 503, displayed is an average or mean value graph 503a of a detection result on an abnormality symptom(s) of signal listing information stored in the data storage unit 300 (ST402).

According to this arrangement, it becomes possible for a user to display the appearance or a situation in which an abnormality symptom(s) of a plurality of signals having been detected on a rule base propagates, in such a manner that the user grasps the situation easier.

Next, on the basis of selection signal listing information stored in the data storage unit 300, that of display time-period information stored therein, that of an abnormality symptom's detection result(s) stored therein and that of master data stored therein, at Step ST404, a displaying process of a propagation details component is performed in the propagation detailed-information graphics-drawing processing unit 53, and a displaying process of plant details information is performed in the plant detailed-information graphics-drawing processing unit 55.

Figure 11:
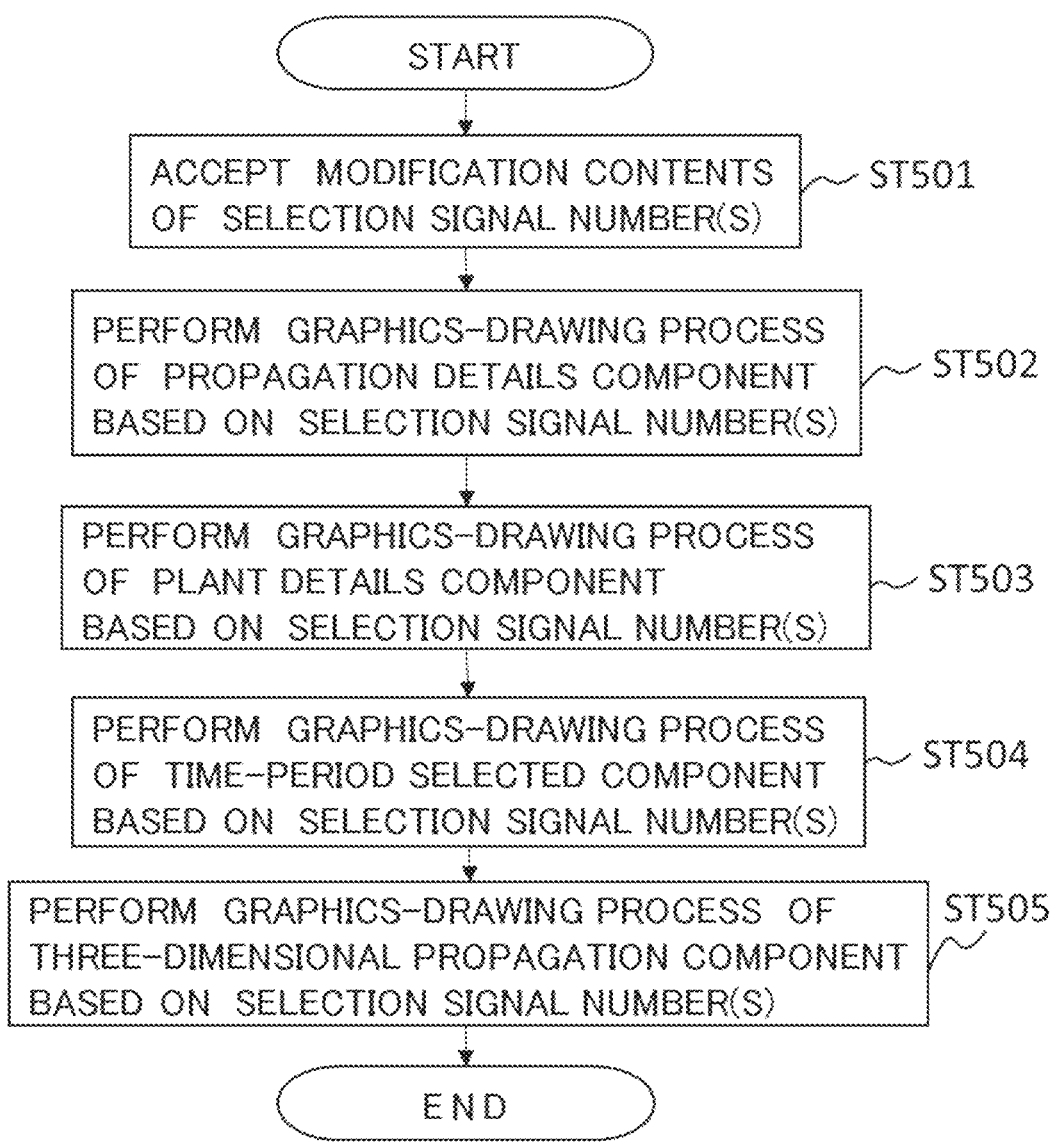
FIG. 11 is a diagram showing a flowchart illustrating the operations in which the abnormality symptom analyzing device according to Embodiment 1 acquires a selection signal(s), until the abnormality symptom analyzing device displays propagation details information and plant details information, and performs graphics-drawing updating processes of screen display components each.

FIG. 11 is a flowchart after a selection signal(s) is acquired until propagation details information and plant details information are displayed, and graphics-drawing updating processes of screen display components each are performed.

At Step ST501, a selection signal number(s) having been selected by the user for displaying details information is accepted.

Next, at Step ST502, a graphics-drawing process for displaying a propagation details component onto the display device 103 is performed in the propagation detailed-information graphics-drawing processing unit 53, on the basis of the selection signal number(s).

Next, at Step ST503, a graphics-drawing process for displaying a plant details component onto the display device 103 is performed in the plant detailed-information graphics-drawing processing unit 55, on the basis of the selection signal number(s).

Next, at Step ST504, a graphics-drawing process for modifying display contents of a time-period selected component is performed in the time-period selection graphics-drawing processing unit 52, on the basis of the selection signal number(s).

Subsequently, at Step ST505, a graphics-drawing process for modifying display contents of a three-dimensional propagation component is performed in the three-dimensional propagation graphics-drawing processing unit 54, on the basis of the selection signal number(s).

Figure 12:
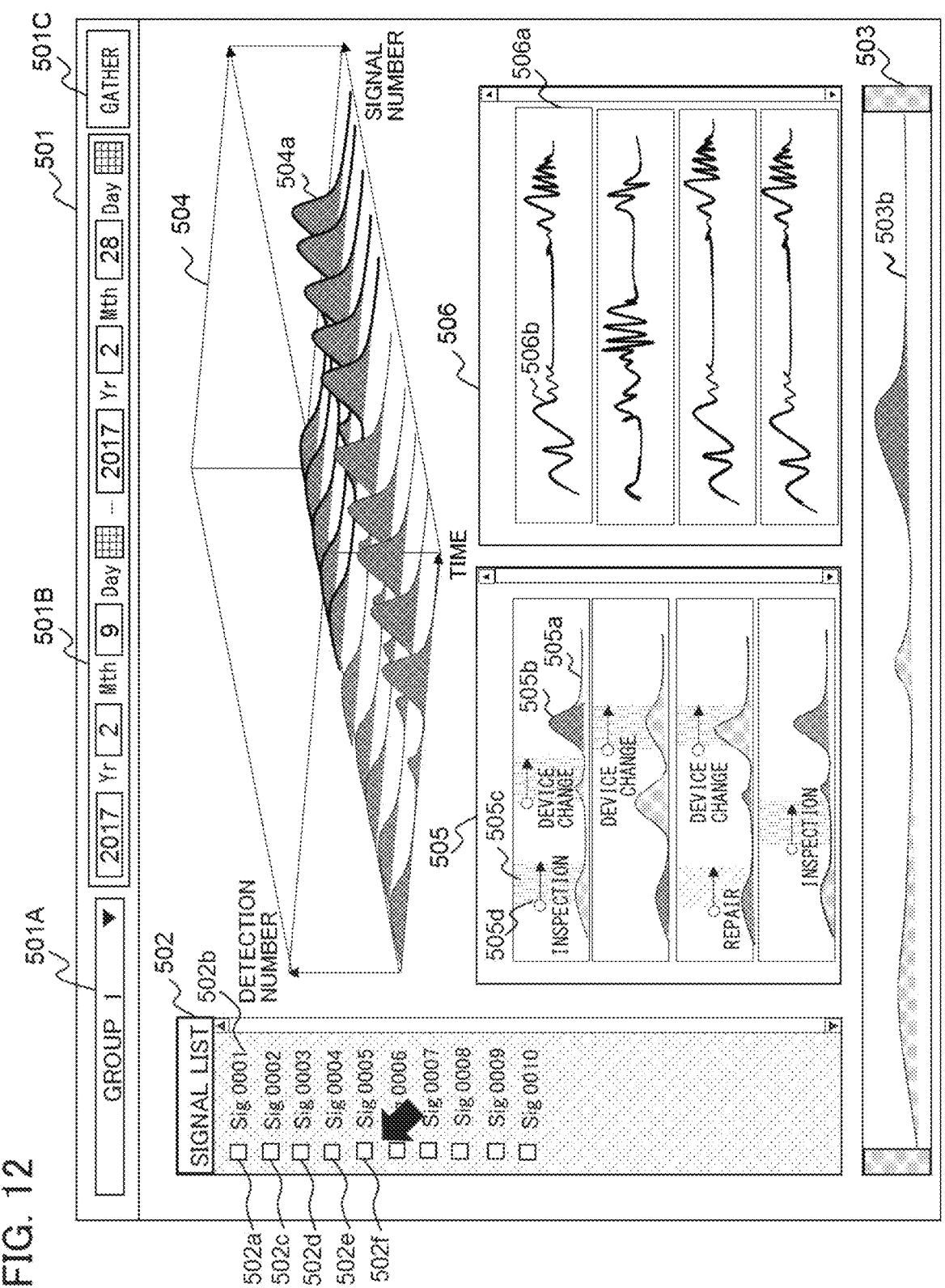
FIG. 12 is a diagram illustrating an example of a screen in which propagation details information and plant details information are displayed, and graphics-drawing updating processes of screen display components have been each performed, on the bases of a signal(s) and a time-period(s) where a user of the abnormality symptom analyzing device according to Embodiment 1 selects.

FIG. 12 is a diagram illustrating an example of a screen in which propagation details information and plant details information are displayed, and graphics-drawing updating processes of screen display components have been each performed, on the bases of a signal(s) and a time-period(s) where a user selects. The user selects, by a mouse click or the like, the signal selection check box 502a, a signal selection check box 502c, a signal selection check box 502d, a signal selection check box 502e and a signal selection check box 502f each displayed in the signal selection listing component 502 (ST501). On the basis of a signal number(s) having been selected, graphics-drawing processes for displaying a propagation details component 505 and a plant details component 506 are each performed to display them in.

In the propagation details component 505, a graphics-drawing process is performed for displaying an abnormality symptom's detection result(s) 505a of a signal number(s) having been selected by the signal selection listing component 502. The abnormality symptom's detection result(s) 505a indicates the number of abnormality symptom(s) having been detected on a rule base through an AI technology or a stochastic process, and so, the graphics-drawing process is performed in such a manner that a color is displayed being filled in when a detection number is larger in its counts (ST502).

In addition, an evaluation degree 505b displayed on the abnormality symptom's detection result 505a indicates the evaluation degree by which the reliability of abnormality symptom having been detected through an AI technology or a stochastic process is shown by shades of a color. For example, in a case in which an abnormality symptom(s) is detected by utilizing learning data, and at a time when pieces of "data having been learned" are presumed to be a data set on a motor facility in normal times and a data set thereon in abnormal times when abnormality occurs due to wear therein, a result having been distinguished on data in which displacement of a rotational axle is caused results in taking on "data having not yet been learned," and thus, an evaluation value becomes low. When the evaluation degree is low, a color of the evaluation degree 505b takes on a dense color; and, when the evaluation degree is high, the color of the evaluation degree 505b takes on a thin color.

An inspection result 505c indicates inspection data stored in the master data storage unit 34 in relation to a facility. A hollow circle is indicated on a time-point when inspection work starts, and an arrow is indicated by extending it until the inspection work ends at it. A background color 505d of inspection work is indicated by filling in it from the start point of the inspection work to the end point thereof.

In the plant details component 506, a graphics-drawing process is performed for displaying a measurement graph 506a which indicates measurement information of the facility on a signal number(s) having been selected by the signal selection listing component 502. In addition, in the measurement graph 506a, a graphics-drawing process is performed for displaying a highlighted line 506b by which a line(s) of the graph is highlighted so that it is made easier to see for a time-period(s) where an abnormality symptom(s) is detected (ST503).

In the time-period selected component 503, a graphics-drawing process for displaying a time-period selection area 503b is performed when a signal is selected by the signal selection listing component. Here, the width of the time-period selection area 503b indicates a time-based span or duration of a display time-period: the left-hand end indicates "2017th Year, 2nd Month, 9th Day, 00:00:00" selected at a time-period selection area 501B; and the right-hand end indicates "2017th Year, 2nd Month, 28th Day, 23:59:59" selected at the time-period selection area 501B (ST504).

In the three-dimensional propagation component 504, a graphics-drawing process for displaying a highlighted line(s) 504a of a selection signal(s) is performed so that a line(s) of graph of an abnormality symptom's detection result(s) on a signal number(s) having been selected by the signal selection listing component is made bold (ST505).

According to this arrangement, it becomes possible to achieve that, while an overall tendency of abnormality symptom's propagation is grasped in the three-dimensional propagation component 504 and in the time-period selected component 503, details information of a plurality of signals is verified by making the signal information as the core in the propagation details component 505 and the plant details component 506.

Next, the explanation will be made for the functions in which, on the basis of a user's operation, a display time-period of screen display components each is modified.

Figure 13:
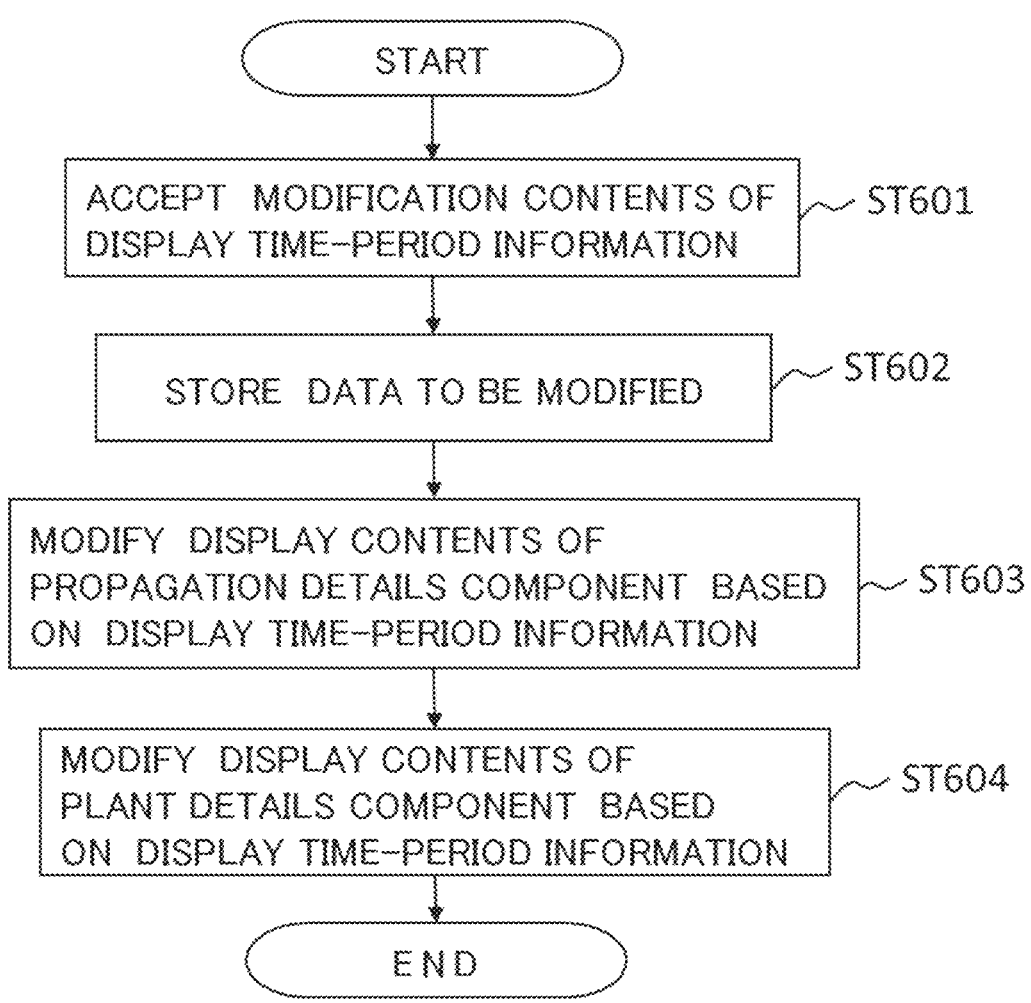
FIG. 13 is a diagram showing a flowchart illustrating the operations until the abnormality symptom analyzing device according to Embodiment 1 updates the modification on display time-period information of screen display components to that of the screen display components, on the basis of a user's operation.

FIG. 13 is a flowchart illustrating the operations until the modification on display time-period information of screen display components is updated to that of the screen display components, on the basis of a user's operation.

At Step ST601, the modification on display time-period information having been modified by a user's operation is accepted by the modification notification unit 42.

Next, on the basis of the coordination items 801 of FIG. 8, at Step ST602, data to be modified is stored from the modification notification unit 42 into the data storage unit 300, so that the data is updated.

Next, on the basis of the modification data and the coordination items 801 of FIG. 8, at Step ST603, a data updating process is executed with respect to a propagation details component whose display time-period information has been made corresponding to a coordination data's item(s), and a modifying process on display contents of the propagation details component is executed.

Subsequently, on the basis of the modification data and the coordination items 801 of FIG. 8, at Step ST604, a data updating process is executed with respect to a plant details component whose display time-period information has been made corresponding to a coordination data's item(s), and a modifying process on display contents of the plant details component is executed.

Figure 14:
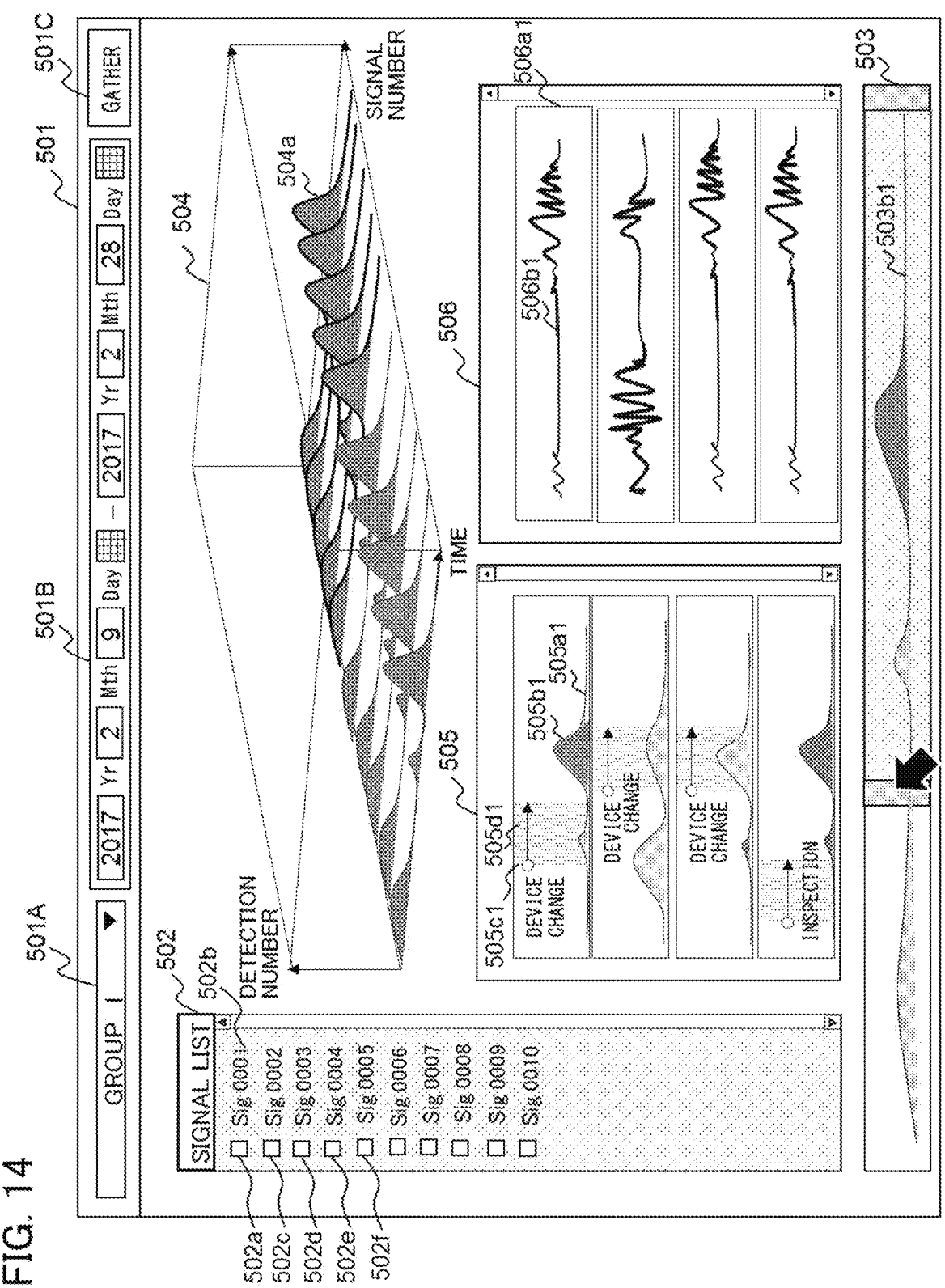
FIG. 14 is a diagram illustrating an example of a screen in which screen display components are updated, on the basis of a user's operation caused by a time-period selected component of the abnormality symptom analyzing device according to Embodiment 1.

FIG. 14 is a diagram illustrating an example of a screen in which screen display components are updated, on the basis of a user's operation caused by the time-period selected component 503. When the user shortens the width of a time-period selection area 503*b*1 by performing a mouse scroll upon the time-period selection area 503*b*1 of the time-period selected component 503, the modification of display time-period information is accepted by the modification notification unit 42 (ST601).

Next, the coordination items 801 of FIG. 8 are referred to from the modification notification unit 42, and display time-period information of coordination data's items is stored in the data storage unit 300, so that its data is updated (ST602). Subsequently, by referring to the coordination items 801 of FIG. 8, the display time-period information having been updated is transmitted to a propagation details component 505 and a plant details component 506 whose pieces of display time-period information are made corresponding to the coordination data's items, and those display time-periods are shortened in the propagation detailed-information graphics-drawing processing unit 53 and in the plant detailed-information graphics-drawing processing unit 55, so that their processes for performing replotting-and-regraphing or graphics-redrawing of those screen display components are executed, respectively.

At this time, in the propagation details component 505 and the plant details component 506, their pieces of display time-period information are updated through the width of the time-period selection area 503*b*1 by way of the coordination unit 400, whereby redrawn are display contents of an abnormality symptom's detection result 505*a*1, those of an evaluation degree 505*b*1, those of an inspection result 505*c*1, those of a background color 505*d*1, those of a measurement graph 506*a*1 and those of a highlighted line 506*b*1 (ST603, ST604).

According to this arrangement, while propagation tendency on an abnormality symptom(s) is grasped, it becomes possible to achieve that, by taking a time-duration or time-period as the core and by narrowing down the information being intendedly verified in detail, data causing the abnormality symptom(s) and acting as its factor(s) is made easily searched.

According to the abnormality symptom analyzing device of Embodiment 1, on the basis of an abnormality symptom's detection result(s) having been detected on a rule base through an AI technology, a stochastic process or the like, it is possible in the three-dimensional propagation graphics-drawing processing unit 54 to display a three-dimensional propagation component 504 whose detection distribution of abnormality symptoms is indicated by convexes-and-concaves in a graph above on a three-dimensional screen and by their areas each being filled in by a color(s) within the graph; on the bases of a signal(s) and a time-period(s) where a user has selected, it is possible in a propagation details component 505 to display an abnormality symptom's detection result(s) on a signal number(s) having been selected by the signal selection listing component 502, an evaluation degree 505*b* indicating the reliability of abnormality symptom by its shades of a color(s), and an inspection result 505*c* indicating information relating to inspection work; and it is possible in a plant details component 506 to display a measurement graph 506*a* indicating measurement information of a facility on a signal number(s) having been selected by a signal selection listing component 502, and a highlighted line(s) 506*b* indicating a time-period(s) where an abnormality symptom(s) is detected.

According to this arrangement, while the user grasps propagation tendency on an abnormality symptom(s) of a plurality of signals having been detected on a rule base, an effect can be achieved as obtaining that, by making the signal information where the user selects as the core, details information of a plurality of signals is made possible to be verified in the propagation details component 505 and in the plant details component 506, so that the explanation for a phenomenon causing the abnormality is easily achieved.

Moreover, according to the abnormality symptom analyzing device of Embodiment 1, when modification of a display time-period is caused by a user's operation upon the time-period selection area 503*b*1 of the time-period selected component 503, display time-period information is updated by the propagation details component 505 and the plant details component 506 by way of the coordination unit 400, whereby the display time-period of a graph(s) on the propagation details component 505 and that of a graph(s) on the plant details component 506 can be modified.

According to this arrangement, an effect can be achieved as obtaining that, by taking a time-period as the core and by narrowing down the information being intendedly verified in detail, data causing an abnormality symptom(s) and acting as its factor(s) is made easily searched.

Embodiment 2

Hereinafter, the explanation will be made referring to the drawings for an abnormality symptom analyzing device according to Embodiment 2. In the following explanation, the same or similar constituent elements, portions or parts designate the same reference numerals and symbols as those constituent elements described in the embodiment having been explained above, and are shown in each of the figures below; and so, their detailed explanation will be appropriately omitted.

Figure 15:
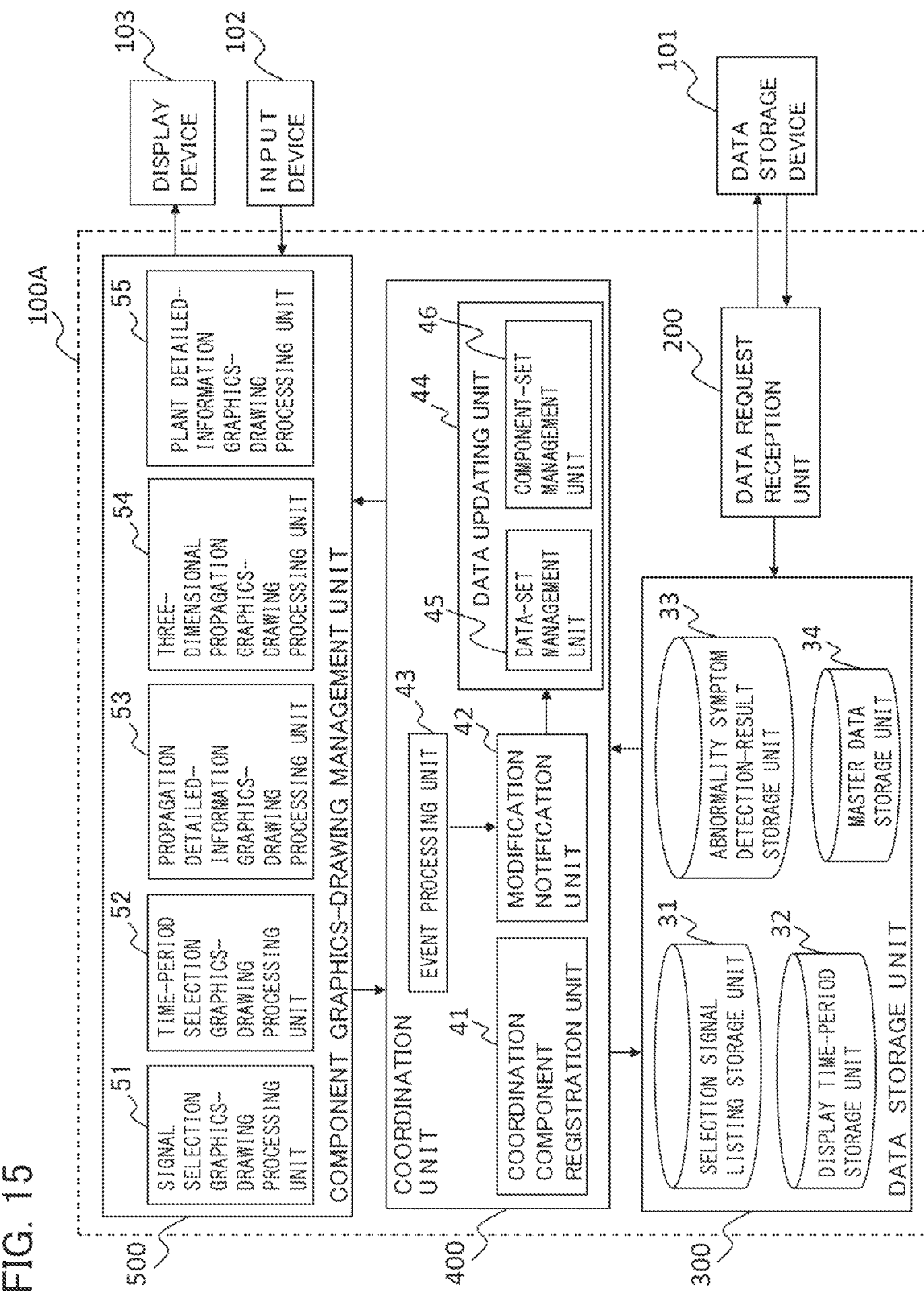
FIG. 15 is a configuration diagram illustrating, by way of example, an abnormality symptom analyzing device according to Embodiment 2.

FIG. 15 is a configuration diagram illustrating the abnormality symptom analyzing device. The abnormality symptom analyzing device 100A in FIG. 15 comprises an event processing unit 43 and a data updating unit 44, in addition to those in the configuration of the abnormality symptom analyzing device that is exemplarily illustrated in FIG. 1.

The data updating unit 44 is constituted of a data-set management unit 45 and a component-set management unit 46.

Referring to FIG. 16 through FIG. 25, the explanation will be made for the operations until the abnormality symptom analyzing device 100A updates display contents of a screen display component(s), on the basis of an event by a user's operation.

Figure 16:
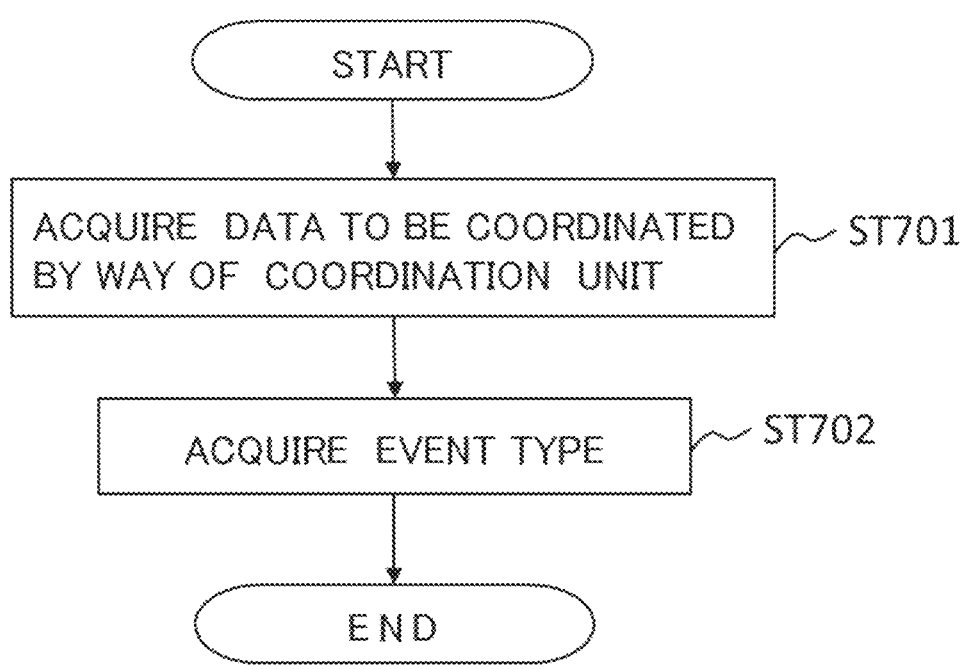
FIG. 16 is a diagram showing a flowchart illustrating the operations of setting processes of data to be coordinated and those processes of an event type in a coordination component registration unit of the abnormality symptom analyzing device according to Embodiment 2 and in an event processing unit thereof, respectively.

FIG. 16 is a flowchart illustrating the operations of setting processes of data to be coordinated and those processes of an event type in the coordination component registration unit 41 according to Embodiment 2 and in the event processing unit 43 thereof, respectively.

Step ST701 and Step ST702 are executed between Step ST101 of FIG. 3 and Step ST103 thereof.

At Step ST701, among the pieces of data stored in the data storage unit 300, data to be coordinated is acquired in the coordination component registration unit 41 by way of the coordination unit 400.

Next, at Step ST702, an event type is acquired in the event processing unit 43 in accordance with input contents of a user. An event designates an action caused on the screen of the display device 103 in such a manner as, for example, a mouse click of a button, a mouse drag-and-drop, a mouseover and the like; and so, when these events are caused, the event type is set to identify therefor how an updating process(es) is to be performed by a screen display component(s).

FIG. 17 is a diagram showing an example of an event type. Those identifiers each in the event type 1701 designate character strings for distinguishing kinds of events. The coordination data designates data for performing the coordination being made by each screen display component when an event is caused. The data structure designates a data structure of the coordination data as an example. The event instruction contents designate instruction contents by which how modification is performed when an event is caused.

The explanation will be made in detail referring to FIG. 20 for those instruction contents of an event(s).

Figure 18:
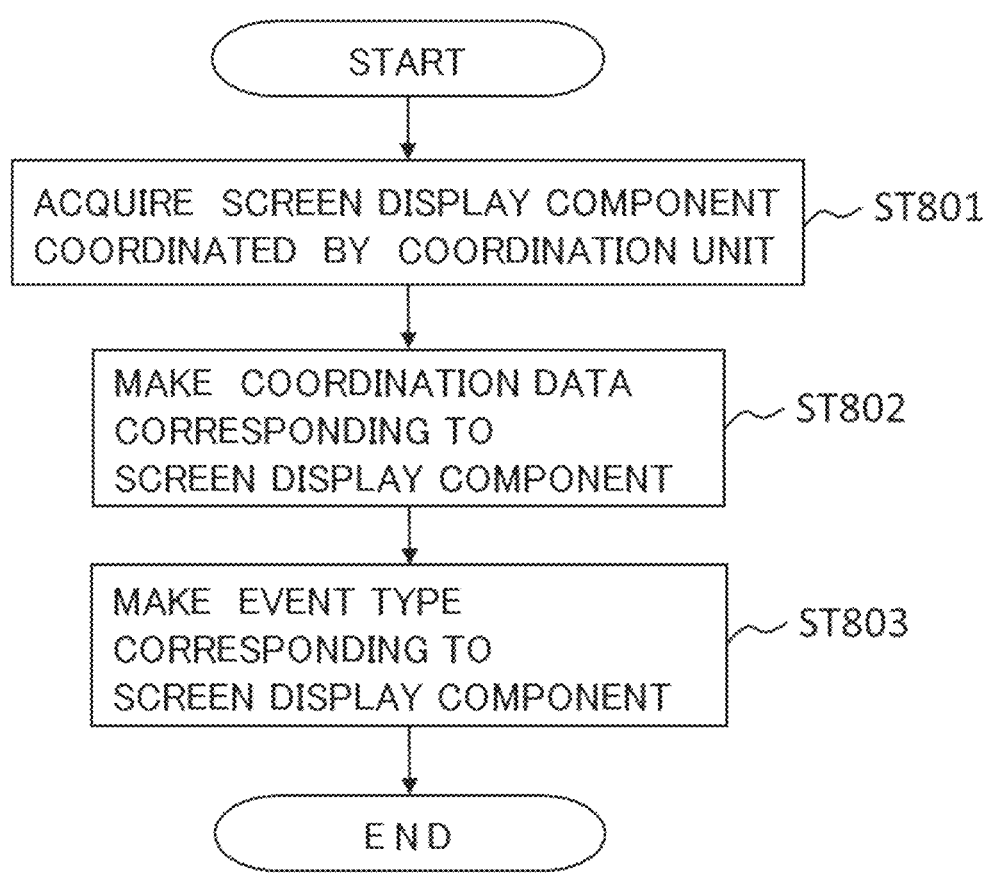
FIG. 18 is a diagram showing a flowchart illustrating the operations until a setting process of a screen display component is coordinated in the coordination component registration unit of the abnormality symptom analyzing device according to Embodiment 2.

FIG. 18 is a flowchart illustrating the operations until a setting process of a screen display component is coordinated in the coordination component registration unit 41. Step ST801, and Step ST802 and Step ST803 are executed between Step ST102 of FIG. 3 and Step ST104 thereof.

At Step ST801, a screen display component coordinated by the coordination unit 400 is acquired in the coordination component registration unit 41.

FIG. 19 is a diagram showing a data example of screen display components which are coordinated in the coordination component registration unit 41.

Screen display component's data 1901 is an example of screen display component's data in which, in addition to the screen display component's data 701 of FIG. 7, a color display component is added thereto. A displaying process of the color display component is performed by the plant detailed-information graphics-drawing processing unit 55. In addition, the explanation will be made referring to FIG. 25 for display contents of the color display component.

Next, at Step ST802, coordination data having been acquired in the coordination component registration unit 41 is made corresponding to the screen display component.

Subsequently, at Step ST803, the event type 1701 of FIG. 17 is made corresponding to the screen display component having been acquired in the coordination component registration unit 41.

FIG. 20 is a diagram showing an example of coordination items which are made corresponding to screen display components at Steps from Step ST801 of FIG. 18 to Step ST803 thereof. The coordination items 2001 designate an example of coordination items in which, with respect to the coordination items 801 of FIG. 8, a color display component is further added to the component name, and focused or given points and pieces of screen display component's information are further added to the coordination data's items, and in which the identifiers of event, or event identifiers, are further added to those items. The event identifiers each designate character strings of the identifiers in the event type 1701 of FIG. 17.

Here, the explanation will be made for examples of instruction contents when each one in the event type is called upon. For example, when an event identifier SigData is called upon a signal selection listing component as an event type, among screen display components to which the identifier SigData is distributed as an event identifier's item, selection signal listing information of the coordination data's items is transmitted to a propagation details component, and a process for modifying a signal listing to be displayed by the propagation details component is performed.

When an event identifier DateRange is called upon a time-period selected component as an event type, among screen display components to which the identifier DateRange is distributed as an event identifier's item, display time-period information of the coordination data's items is transmitted to a plant details component, and a modifying process on a display time-period to be displayed by the plant details component is performed.

When an event identifier DataPoint is called upon the time-period selected component as an event type, among screen display components to which the identifier DataPoint is distributed as an event identifier's item, information on given points of the coordination data's items is transmitted to a plant details component, and a modifying process on display contents of the given points to be displayed by the plant details component is performed.

When an event identifier ModeType is called upon the plant details component as an event type, among screen display components to which the identifier ModeType is distributed as an event identifier's item, screen display component's information of the coordination data's items is transmitted to a color display component, and a screen display component to be displayed is changed over from a plant details component to the color display component.

The explanation will be made after FIG. 22 onward for modification examples of display contents on each screen by means of these event identifiers.

Next, on the basis of an event by a user's operation, the explanation will be made for the operations by which data of a screen display component(s) is updated, and for the operations by which the screen display component(s) is updated.

Figure 21:
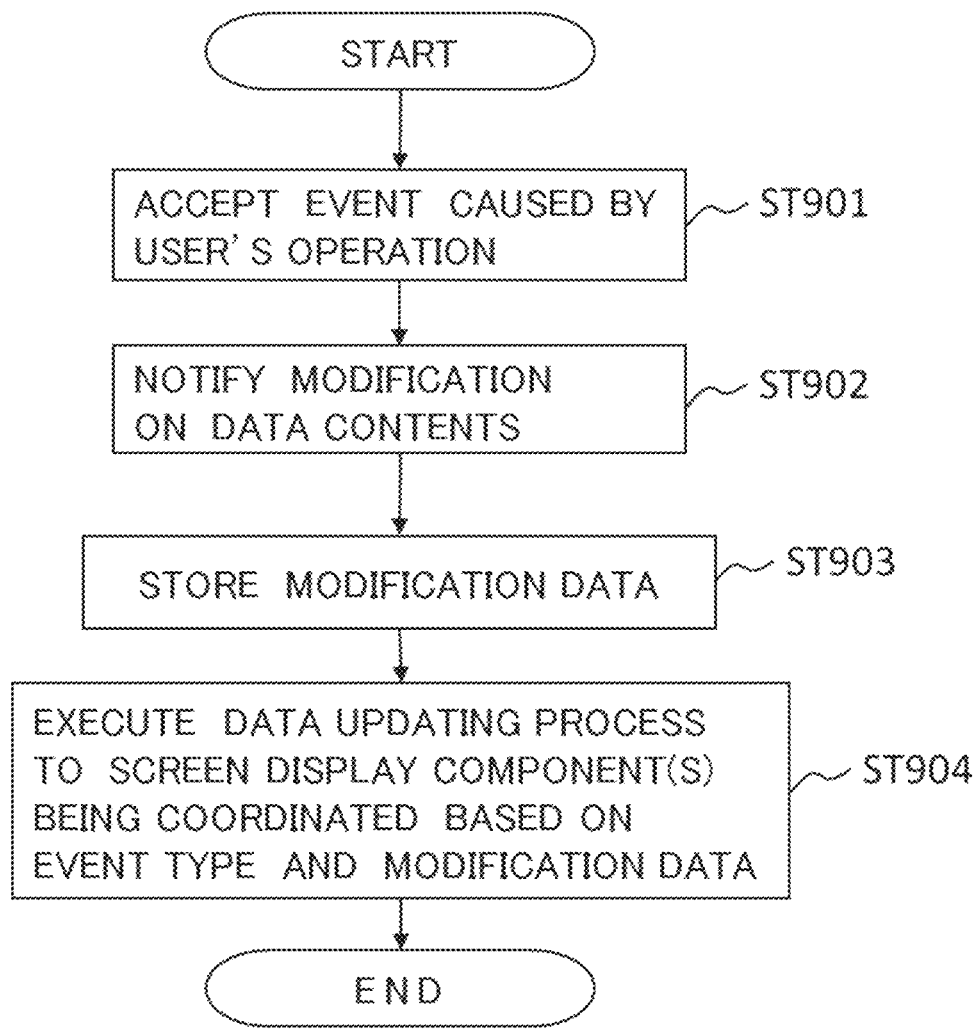
FIG. 21 is a diagram showing a flowchart illustrating the operations until the abnormality symptom analyzing device according to Embodiment 2 executes a data updating process of a screen display component(s), on the basis of an event by a user's operation.

FIG. 21 is a flowchart illustrating the operations until a data updating process of a screen display component(s) is executed, on the basis of an event by a user's operation.

At Step ST901, an event caused by a user's operation is accepted by the event processing unit 43.

Next, at Step ST902, on the basis of the event type 1701 of FIG. 17, data to be modified is notified from the modification notification unit 42 to the data storage unit 300.

Next, at Step ST903, modification data having been notified from the modification notification unit 42 is stored by means of the data storage unit 300, so that the data is updated.

Subsequently, at Step ST904, on the bases of an event type caused by a user's operation, the respective pieces of modification data and the coordination items 2001 of FIG. 20, a data updating process is executed by the data-set management unit 45 with respect to a screen display component(s) in which the same event type is set as the event type having been caused. On the basis of the modification data having been executed by the data-set management unit 45, replotting-and-regraphing or graphics-redrawing of the screen display component(s) is performed.

Figure 22:
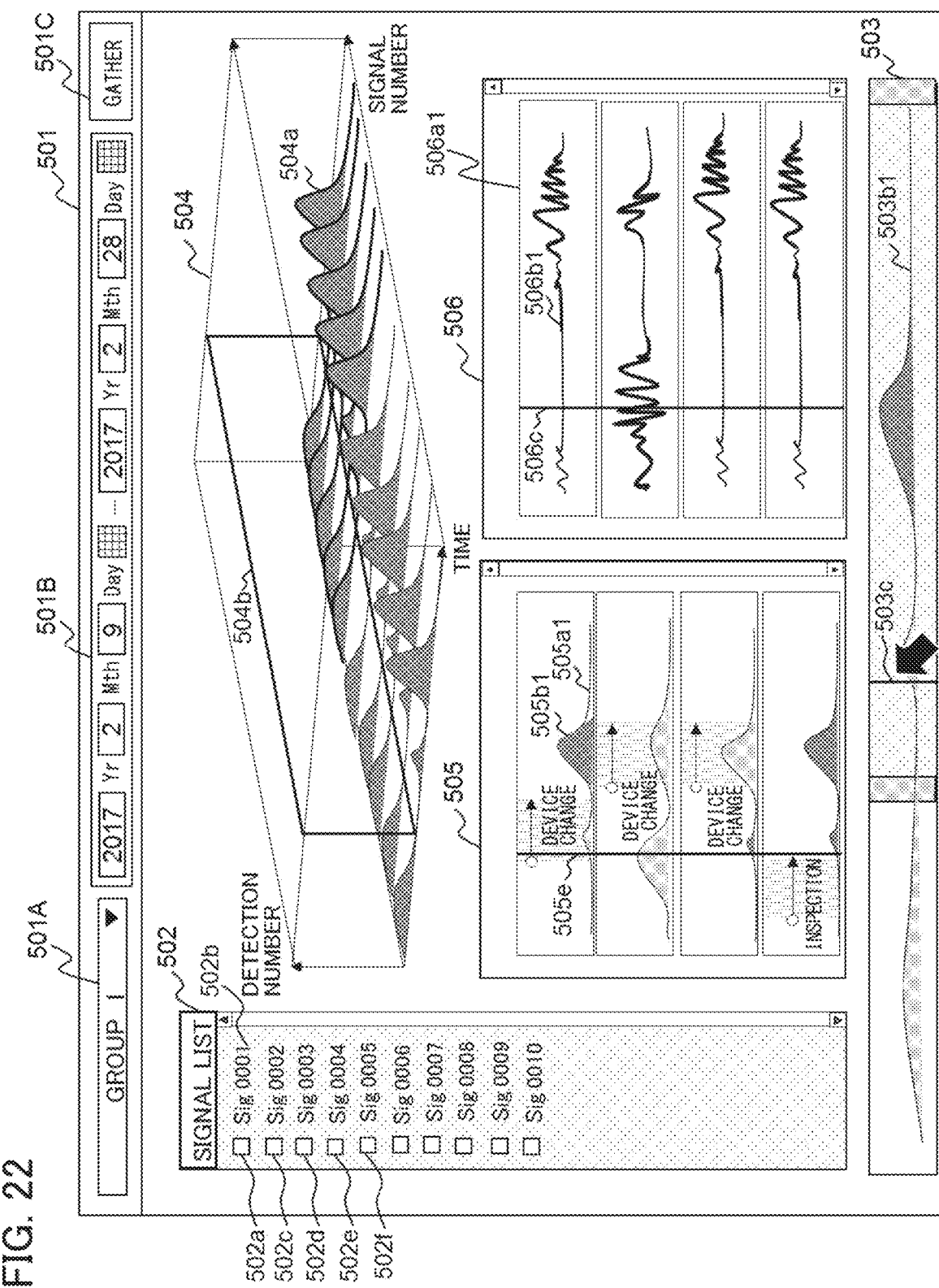
FIG. 22 is a diagram illustrating an example of a screen in which the abnormality symptom analyzing device according to Embodiment 2 updates screen display components, on the basis of an event caused by a time-period selected component.

FIG. 22 is a diagram illustrating an example of a screen in which, on the basis of an event caused by the time-period selected component 503, screen display components are updated. When a focused or given bar 503c is displayed upon the time-period selected component 503 because a user performs a mouseover upon the time-period selection area 503b1 of the time-period selected component 503, an event of an event identifier DataPoint is accepted by the event processing unit 43 (ST901).

Next, the coordination items 2001 of FIG. 20 are referred to from the modification notification unit 42, and modification on given points of data coordination items is notified to the data storage unit 300 (ST902); and the modification on the given points is stored therein, so that the data therein is updated (ST903).

Next, in the data-set management unit 45, the coordination items 2001 of FIG. 20 are referred to, and a given point(s) having been updated is transmitted to the propagation details component 505, the plant details component 506 and the three-dimensional propagation component 504 to each of which an identifier DataPoint is distributed as an event identifier's item, so that a process for performing graphics-redrawing of a given bar(s) is executed in the propagation detailed-information graphics-drawing processing unit 53, the plant detailed-information graphics-drawing processing unit 55 and the three-dimensional propagation graphics-drawing processing unit 54, respectively.

At this time, with respect to the propagation details component 505, the plant details component 506 and the three-dimensional propagation component 504, a given point is updated from upon a position at the given bar 503c of the time-period selected component 503 by way of the coordination unit 400, whereby a position of a given bar 505e, that of a given bar 506c, and that of a focused or given area 504b are redrawn, respectively (ST904).

According to this arrangement, the user verifies time(s) to give attention to upon a plurality of graphs by using a given bar(s) upon the graphs each, whereby it becomes possible to easily search data causing an abnormality symptom(s) and acting as its factor(s).

Figure 23:
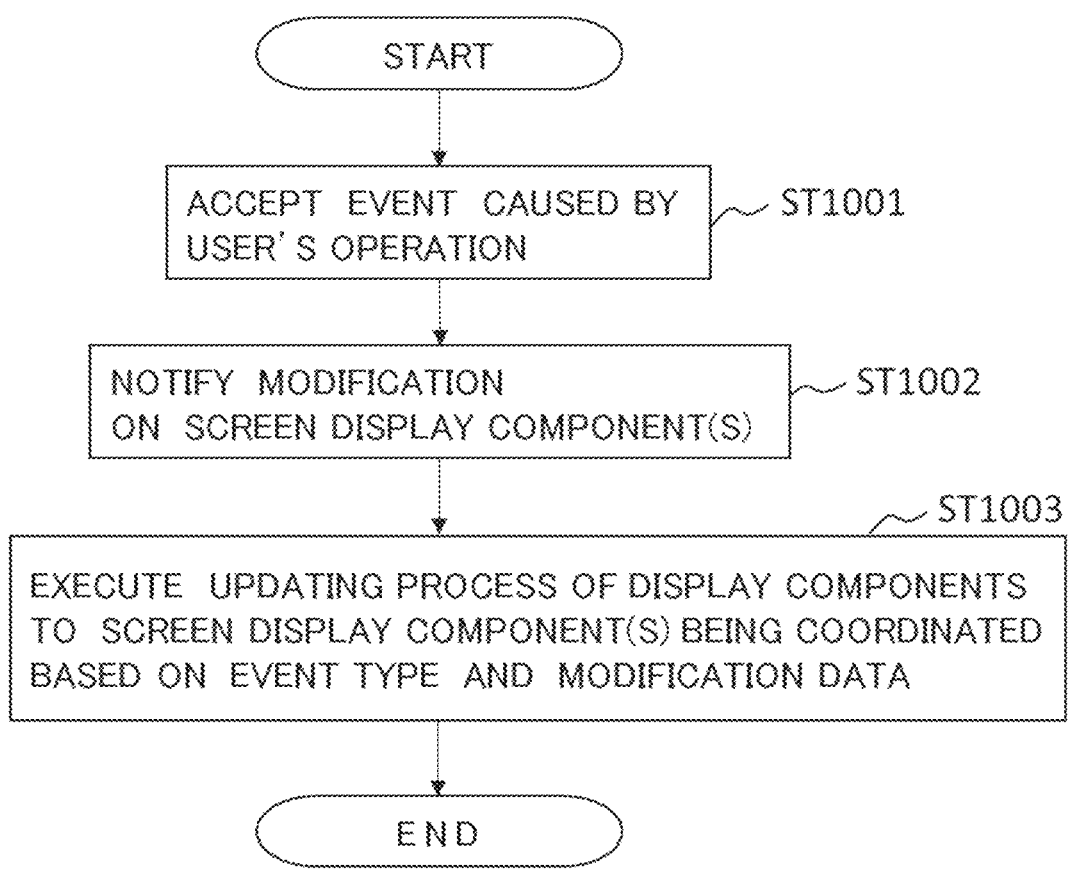
FIG. 23 is a diagram showing a flowchart illustrating the operations until the abnormality symptom analyzing device according to Embodiment 2 executes an updating process of a screen display component(s), on the basis of an event by a user's operation.

FIG. 23 is a flowchart illustrating the operations until an updating process of a screen display component(s) is executed, on the basis of an event by a user's operation.

At Step ST1001, an event caused by a user's operation is accepted by the event processing unit 43.

Next, at Step ST1002, on the basis of the event type 1701 of FIG. 17, a screen display component's ID to be modified is notified from the modification notification unit 42 to the component-set management unit 46.

Subsequently, in the component-set management unit 46 at Step ST1003, on the basis of an event type caused by the user's operation, that of the screen display component's ID having been notified from the modification notification unit 42 and that of the coordination items 2001 of FIG. 20, an updating process of display components is executed with respect to a screen display component(s) in which the same event type is set as the event type having been caused. On the basis of the updating process having been executed by the component-set management unit 46, the screen display component(s) is redrawn at a position of the graph-coordinates, that of the width and that of the height which are described in the screen display component's data 1901 of FIG. 19.

Figure 24:
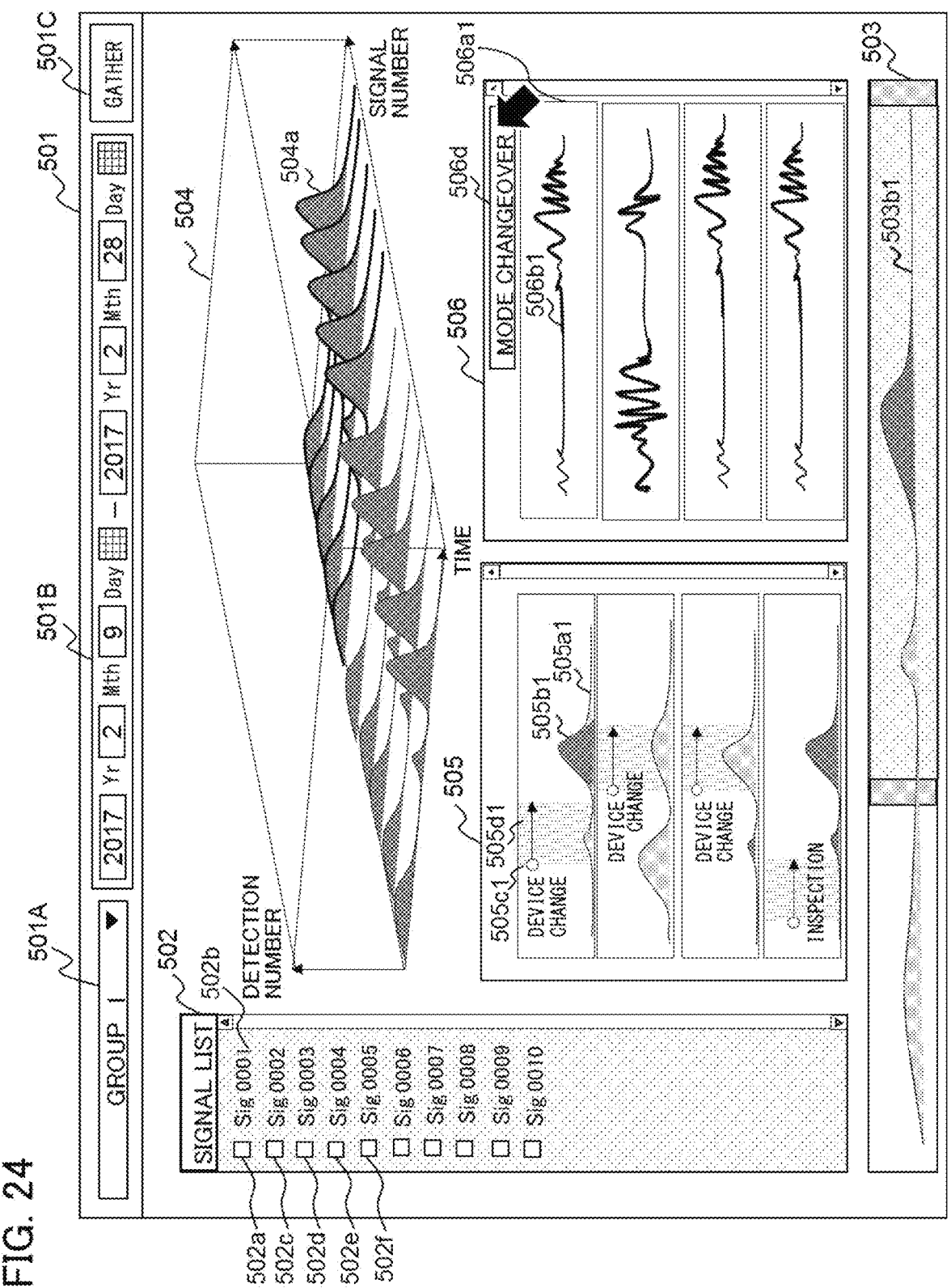
FIG. 24 is a diagram illustrating an example of a screen in which the abnormality symptom analyzing device according to Embodiment 2 changes over a screen display component, on the basis of an event by a user's operation.

FIG. 24 is a diagram illustrating an example of a screen in which a screen display component is changed over, on the basis of an event by a user's operation. In FIG. 24, to the plant details component 506 of FIG. 22, a mode changeover button 506d is further added by which the plant details component 506 is changed over to a component to be displayed on the basis of screen display component's information.

When the user pushes down the mode changeover button 506d, an event of an event identifier ModeType is accepted by the event processing unit 43 (ST1001). Next, the coordination items 2001 of FIG. 20 are referred to from the modification notification unit 42, and, with respect to color display components to each of which an identifier ModeType is distributed as an event identifier, the notification of updating screen display component's information is made to the component-set management unit 46 (ST1002).

In the component-set management unit 46, the coordination items 2001 of FIG. 20 and the screen display component's data 1901 of FIG. 19 are referred to, and the display is changed over from the plant details component 506 to the color display component, so that a process for performing its graphics-redrawing is executed (ST1003).

Figure 25:
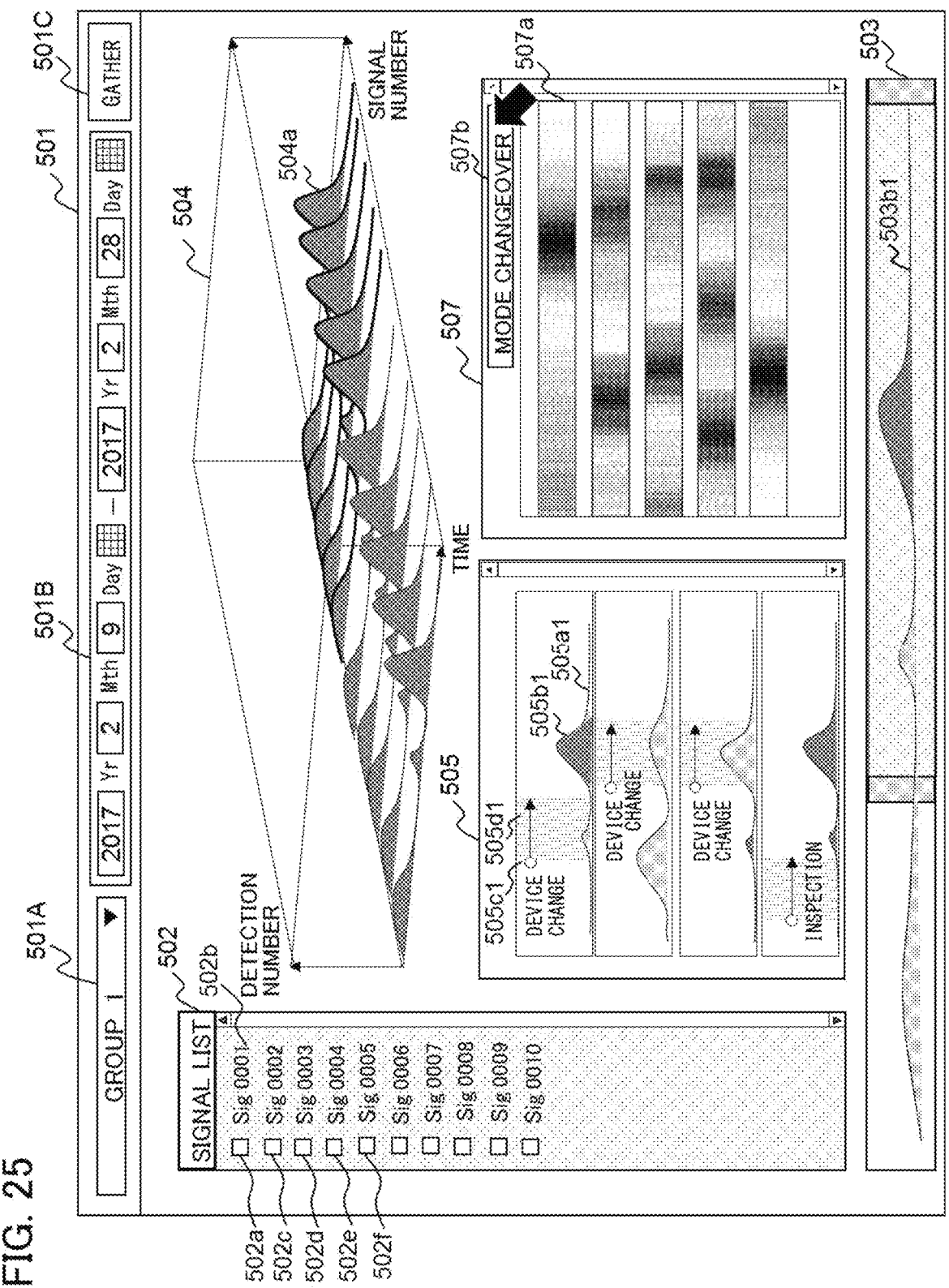
FIG. 25 is a diagram illustrating an example of a screen in which the abnormality symptom analyzing device according to Embodiment 2 changes over a plant details component to a color display component, on the basis of an event by a user's operation.

FIG. 25 is a diagram illustrating an example of a screen in which a plant details component is changed over to a color display component, on the basis of an event by a user's operation. The figure is an example of the screen in which, because of the user who has pushed down the mode changeover button 506d in FIG. 23, the coordination items 2001 of FIG. 20 and the screen display component's data 1901 of FIG. 19 are referred to in the component-set management unit 46, and the display is changed over from the plant details component 506 to the color display component 507, so that a replotting-and-regraphing or graphics-redrawing process is reached at completion.

At this time, on the basis of a value(s) of the measurement graph 506a displayed by the plant details component 506, the conversion into a color graph 507a expressed by shades of a color(s) is performed in the color display component 507 in accordance with a mode changeover button 507b which is pushed down, so that the color graph is displayed (a color diagram(s) is not shown in the figures; as for a displaying method of those colors, refer to Patent Document 3, for example). In this case, when a measurement value(s) deviates further from that in normal times, a color is displayed denser, and, when the measurement value(s) is closer to its normal time one, the color is displayed thinner.

Even in a case in which an event identifier ModeType is selected at three items or more, it is possible to sequentially display screen display components to each of which the identifier ModeType is distributed as an event identifier's item, at each time when the mode changeover button is pushed down. In addition, when there exist identifiers ModeType1 and ModeType2 each as event identifier's items, for example, it is also possible to achieve that a set of screen display components to be changed over by the identifier ModeType1 and the identifier ModeType2 is modified, and that a set of the plurality of screen display components is processed by dividing them by those event identifiers.

According to this arrangement, a plurality of screen display components is made possible to be displayed by one screen, and a factor(s) acting on an abnormality symptom(s) can be searched by various kinds of graphs, so that it is possible to easily make the explanation for a phenomenon causing the abnormality.

According to the abnormality symptom analyzing device of Embodiment 2, when an event is caused in which the given bar 503c is displayed in the time-period selected component 503 by means of a mouse operation of the user, given points are each updated in the propagation details component 505 through the coordination unit 400, the plant details component 506 therethrough and the three-dimensional propagation component 504 therethrough, whereby respective given bars of these screen display components can be displayed.

According to this arrangement, an effect can be achieved as obtaining that, by using a given bar(s) on a plurality of graphs each and by allowing the user thereon to verify time(s) to give attention to, data causing an abnormality symptom(s) and acting as its factor(s) is searched in an easier manner.

In addition, according to the abnormality symptom analyzing device of Embodiment 2, when an event is caused in which a screen display component to be displayed is changed over by the user who pushes down a mode changeover button 506d upon the plant details component 506, a screen display component's ID is updated by way of the coordination unit 400 to display the screen display component on the display device 103, whereby the screen display component to be displayed can be changed over from the plant details component 506 to a color display component 507.

According to this arrangement, an effect can be achieved as obtaining that a plurality of screen display components is made possible to be displayed by one screen, and the search of a factor(s) acting on an abnormality symptom(s) can be performed by various kinds of graphs, so that the explanation for a phenomenon causing the abnormality is easily achieved.

Moreover, in the disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Numeral "1" designates a display; "2," keyboard; "3," mouse; "4," monitored facility; "5," input-output interface; "6," network interface; "7," central calculation processing device (CPU); "8," program memory device; "9," data memory device; "31," selection signal listing storage unit; "32," display time-period storage unit; "33," abnormality symptom detection-result storage unit; "34," master data storage unit; "41," coordination component registration unit; "42," modification notification unit; "43," event processing unit; "44," data updating unit; "45," data-set management unit; "46," component-set management unit; "51," signal selection graphics-drawing processing unit; "52," time-period selection graphics-drawing processing unit; "53," propagation detailed-information graphics-drawing processing unit; "54," three-dimensional propagation graphics-drawing processing unit; "55," plant detailed-information graphics-drawing processing unit; "100," "100A," abnormality symptom analyzing device; "101," data storage device; "102," input device; "103," display device; "200," data request reception unit; "300," data storage unit; "400," coordination unit; "500," component graphics-drawing management unit; "501," plant data selection area; "501A," signal group selection area; "501B," time-period selection area; "501C," data gathering button; "502," signal selection listing component; "502a," "502c," "502d," "502e," "502f," signal selection check box; "502b," signal number; "503," time-period selected component; "503a," mean value graph; "503b," "503b1," time-period selection area; "503c," given bar; "504," three-dimensional propagation component; "504a," highlighted line; "504b," given area; "505," propagation details component; "505a," "505a1," abnormality symptom's detection result; "505b," "505b1," evaluation degree; "505c," "505c1," inspection result; "505d," "505d1," background color; "505e," "506c," given bar; "505b1," evaluation degree; "506," plant details component; "506a," "506a1," measurement graph; "506d," "507b," mode changeover button; "507," color display component; "507a," color graph; "701," screen display component's data; "801," coordination items; "1701," event type; "1901," screen display component's data; and "2001," coordination items.

What is claimed is:

1. An abnormality symptom analyzing device, comprising:
 a processor; and
 memory storing programs that upon execution configure the processor to:
 request transmission of date-time attached data including measurement information obtained from a sensor mounted on a facility, detection information detected from the measurement information and inspection information obtained by inspecting the facility to a data storage device being externally provided for storing said data therein, and for receiving said data from the data storage device;
 receive from the request and store to internal memory said data;
 coordinate settings of screen display components at a time when said data is classified in accordance with a kind of data being received and at a time when each different piece of which is displayed on an externally provided display device, the screen display components including a time-period selected component for a selection of a display time-period and including a three-dimensional propagation component to display a situation in which an abnormality symptom of a plurality of signals propagates, for making coordination data, having display time-period information, including a display date-time being coordinated between the screen display components, corresponding to the screen display components each having the coordination data so that the data being made corresponding to is registered as coordination component data in the processor; the processor further configured to transmit to the internal memory the coordination component data being registered, and the coordination component data being made modified in accordance with modification of the coordination data having display time-period information which is modified and which includes modification of the display date-time;

receive said date-time attached data from an input device being externally provided, transmit the received data for coordinating display, acquire data stored in the internal storage by way of the coordinating; and perform a graphics-drawing process including a graphics-redrawing process to display on the display device said data in each piece of which being classified and while being made corresponding to the inspection information and to the measurement information in accordance with screen display components whose display time-periods are each shortened among pieces of data being acquired, and to transmit to the display device data on which a graphics-drawing process is performed and in which, on a basis of display time-period information being modified, a detection result of an abnormality symptom corresponding to the facility and being detected on a rule base through an artificial intelligence technology or a stochastic process is included.

2. The abnormality symptom analyzing device as set forth in claim 1, wherein the processor is further configured to:

display by the display device signal listing information being one piece of data of the acquired coordination component data, and for performing by the display device a graphics-drawing process for modifying a display state of the plurality of screen display components each and a non-display state thereof, on a basis of data being selected by the input device;

perform a process for displaying by the display device time-period information being another piece of data of the acquired coordination component data and for performing a graphics-drawing process for changing over a display date-time displayed by the display device, on a basis of time-period information in relation to the facility selected by the input device;

perform a graphics-drawing process for three-dimensionally displaying by the display device a propagation situation of a signal appearing to be abnormal, on a basis of detection information of an abnormality symptom on the facility acquired by the processor;

perform a graphics-drawing process for displaying by the display device a propagation situation of a signal appearing to be abnormal and inspection information of the facility, on a basis of acquired detection information of the abnormality symptom; and perform a graphics-drawing process for displaying by the display device measurement information of the facility selected by the input device.

3. The abnormality symptom analyzing device as set forth in claim 1, wherein the processor is further configured to:

accept an event in accordance with an input from the input device; and perform an updating process of the screen display components each, on a basis of modification information of said data stored in the internal memory, and on that of modification information on display contents of the screen display components each being notified.

4. The abnormality symptom analyzing device as set forth in claim 3, wherein the processor is further configured to perform a graphics-drawing process for highlighting a given point of the screen display components each on a basis of said data being updated, and to perform a change-over process of a screen display component for displaying it on the display device on a basis of said data being updated.

5. The abnormality symptom analyzing device as set forth in claim 2, wherein the processor is further configured to:

accept an event in accordance with an input from the input device; and perform an updating process of the screen display components each, on a basis of modification information of said data stored in the internal memory, and on that of modification information on display contents of the screen display components each being notified.

6. The abnormality symptom analyzing device as set forth in claim 5, wherein the processor is further configured to perform a graphics-drawing process for highlighting a given point of the screen display components each on a basis of said data being updated, and to perform a change-over process of a screen display component for displaying it on the display device on a basis of said data being updated.

\* \* \* \* \*